(12) United States Patent
Hwang et al.

(10) Patent No.: US 11,382,013 B2
(45) Date of Patent: Jul. 5, 2022

(54) METHOD FOR MEASUREMENT REPORT EVENT OPERATION AND NETWORK SIGNALING IN UE AUTONOMOUS HANDOVER

(71) Applicant: Samsung Electronics Co., Ltd., Suwon-si (KR)

(72) Inventors: June Hwang, Incheon (KR); Hyunjeong Kang, Seoul (KR); Jungmin Moon, Suwon-si (KR); Youngjoong Mok, Hwaseong-si (KR); Sangkyu Baek, Yongin-si (KR); Jonghyung Kwun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 11 days.

(21) Appl. No.: 16/610,880

(22) PCT Filed: May 4, 2018

(86) PCT No.: PCT/KR2018/005208
§ 371 (c)(1),
(2) Date: Nov. 4, 2019

(87) PCT Pub. No.: WO2018/203716
PCT Pub. Date: Nov. 8, 2018

(65) Prior Publication Data
US 2020/0077314 A1    Mar. 5, 2020

(30) Foreign Application Priority Data

May 4, 2017    (KR) .................... 10-2017-0057093
Apr. 11, 2018  (KR) .................... 10-2018-0042177

(51) Int. Cl.
*H04W 36/08*    (2009.01)
*H04W 36/36*    (2009.01)
(Continued)

(52) U.S. Cl.
CPC ....... *H04W 36/08* (2013.01); *H04W 36/0072* (2013.01); *H04W 36/00835* (2018.08);
(Continued)

(58) Field of Classification Search
CPC ................. H04W 36/08; H04W 36/36; H04W 36/00835; H04W 36/0072; H04W 36/30
(Continued)

(56) References Cited

U.S. PATENT DOCUMENTS 10,681,565 B2 *  6/2020  Xu .................... H04W 24/04
2009/0046656 A1  2/2009  Kitazoe et al.
(Continued)

FOREIGN PATENT DOCUMENTS

CN    102740381 A    10/2012
JP    2011091852 A    5/2011
(Continued)

OTHER PUBLICATIONS

ISA/KR, International Search Report and Written Opinion of the International Searching Authority, International Application No. PCT/KR2018/005208, dated Aug. 17, 2018, 13 pages.
(Continued)

*Primary Examiner* — Liton Miah

(57) ABSTRACT

The present disclosure relates to a communication technique for fusing, with an IoT technology, a 5G communication system for supporting a higher data transfer rate than a 4G system, and a system therefor. The present disclosure may be applied to intelligent services, such as smart homes, smart buildings, smart cities, smart cars or connected cars, health care, digital education, retailing, security and safety-related services, etc. on the basis of 5G communication technologies and IoT-related technologies. Disclosed in the disclosure is a method for measurement report/event operation and network signaling in an UE autonomous handover.

11 Claims, 23 Drawing Sheets

(51) Int. Cl.
  *H04W 36/30* (2009.01)
  *H04W 36/00* (2009.01)
  *H04W 76/27* (2018.01)
(52) U.S. Cl.
  CPC .......... *H04W 36/30* (2013.01); *H04W 36/36* (2013.01); *H04W 76/27* (2018.02)
(58) Field of Classification Search
  USPC ................................................. 455/436–444
  See application file for complete search history.

(56) References Cited

U.S. PATENT DOCUMENTS

| | | | |
|---|---|---|---|
| 2010/0034173 A1* | 2/2010 | Luo .................. | H04W 36/30 370/332 |
| 2010/0330999 A1* | 12/2010 | Larsson ............. | H04W 36/08 455/439 |
| 2011/0103221 A1* | 5/2011 | Lee ................... | H04L 5/0007 370/216 |
| 2011/0250892 A1* | 10/2011 | Gupta ............... | H04W 36/0011 455/437 |
| 2011/0292859 A1* | 12/2011 | So ..................... | H04W 36/0007 370/312 |
| 2012/0178450 A1* | 7/2012 | Kuru .................. | H04W 36/245 455/436 |
| 2012/0270550 A1 | 10/2012 | Shi | |
| 2013/0178211 A1* | 7/2013 | Wang ................. | H04W 24/02 455/436 |
| 2013/0182563 A1* | 7/2013 | Johansson .......... | H04W 76/19 370/216 |
| 2014/0038612 A1 | 2/2014 | Wang et al. | |
| 2014/0045500 A1* | 2/2014 | Dimou ............... | H04W 36/30 455/436 |
| 2014/0087734 A1* | 3/2014 | Wang ................. | H04W 36/0083 455/436 |
| 2014/0204733 A1* | 7/2014 | Takahashi .......... | H04W 36/36 370/225 |
| 2014/0248882 A1* | 9/2014 | Wang ................. | H04W 24/04 455/436 |
| 2014/0335861 A1* | 11/2014 | De Benedittis ... | H04W 36/0061 455/436 |
| 2014/0349647 A1* | 11/2014 | Chen .................. | H04W 36/0083 455/436 |
| 2014/0357275 A1* | 12/2014 | Quan .................. | H04W 36/00835 455/436 |
| 2015/0029835 A1* | 1/2015 | Zhang ................ | H04W 24/04 370/225 |
| 2015/0036658 A1* | 2/2015 | Mochizuki .......... | H04W 16/14 370/331 |
| 2015/0172964 A1* | 6/2015 | Huang ............... | H04W 36/0033 455/437 |
| 2016/0119828 A1* | 4/2016 | Dalsgaard .......... | H04W 36/04 455/444 |
| 2016/0366619 A1* | 12/2016 | Yang .................. | H04W 36/0016 |
| 2017/0019820 A1* | 1/2017 | Das .................... | H04W 48/20 |
| 2017/0086106 A1 | 3/2017 | Yiu et al. | |
| 2017/0086107 A1* | 3/2017 | Hu ..................... | H04B 17/382 |
| 2017/0195983 A1* | 7/2017 | Chami ............... | H04W 12/0602 |
| 2017/0325279 A1* | 11/2017 | Grant ................. | H04W 76/19 |
| 2020/0187069 A1* | 6/2020 | Hong .................. | H04W 36/36 |

FOREIGN PATENT DOCUMENTS

| | | |
|---|---|---|
| JP | 2011-254466 A | 12/2011 |
| KR | 10-2003-0056315 A | 7/2003 |
| KR | 10-2010-0032905 A | 3/2010 |
| KR | 10-2012-0022482 A | 3/2012 |
| KR | 20120103748 A | 9/2012 |
| KR | 10-2016-0013611 A | 2/2016 |
| WO | 2008157717 A1 | 12/2008 |

OTHER PUBLICATIONS

Supplementary European Search Report in connection with European Application No. 18793879.0 dated Jan. 27, 2020, 13 pages.
Ericsson, "Conditional Handover," Tdoc R2-1702675 (Update of R2-1700864), 3GPP TSG-RAN WG2 #97bis, Spokane, USA, Apr. 3-7, 2017, 5 pages.
Lenovo et al, "Conditional handover in NR," R2-1702794, 3GPP TSG-RAN WG2 Meeting#97bis, Spokane,USA, Apr. 3-7, 2017, 3 pages.
Samsung, "Introduction of UE autonomous handover," R2-1703287, 3GPP TSG-RAN WG2 2017 RAN2#97bis Meeting, Spokane, USA, Apr. 3-7, 2017, 4 pages.
The First Office Action dated May 8, 2021, in connection with a counterpart Chinese patent application No. 201880029443.X, 15 pages.
Korean Intellectual Property Office, "Office Action," dated Apr. 26, 2022, in connection with Korean Patent Application No. 10-2018-0051921, 12 pages.

* cited by examiner

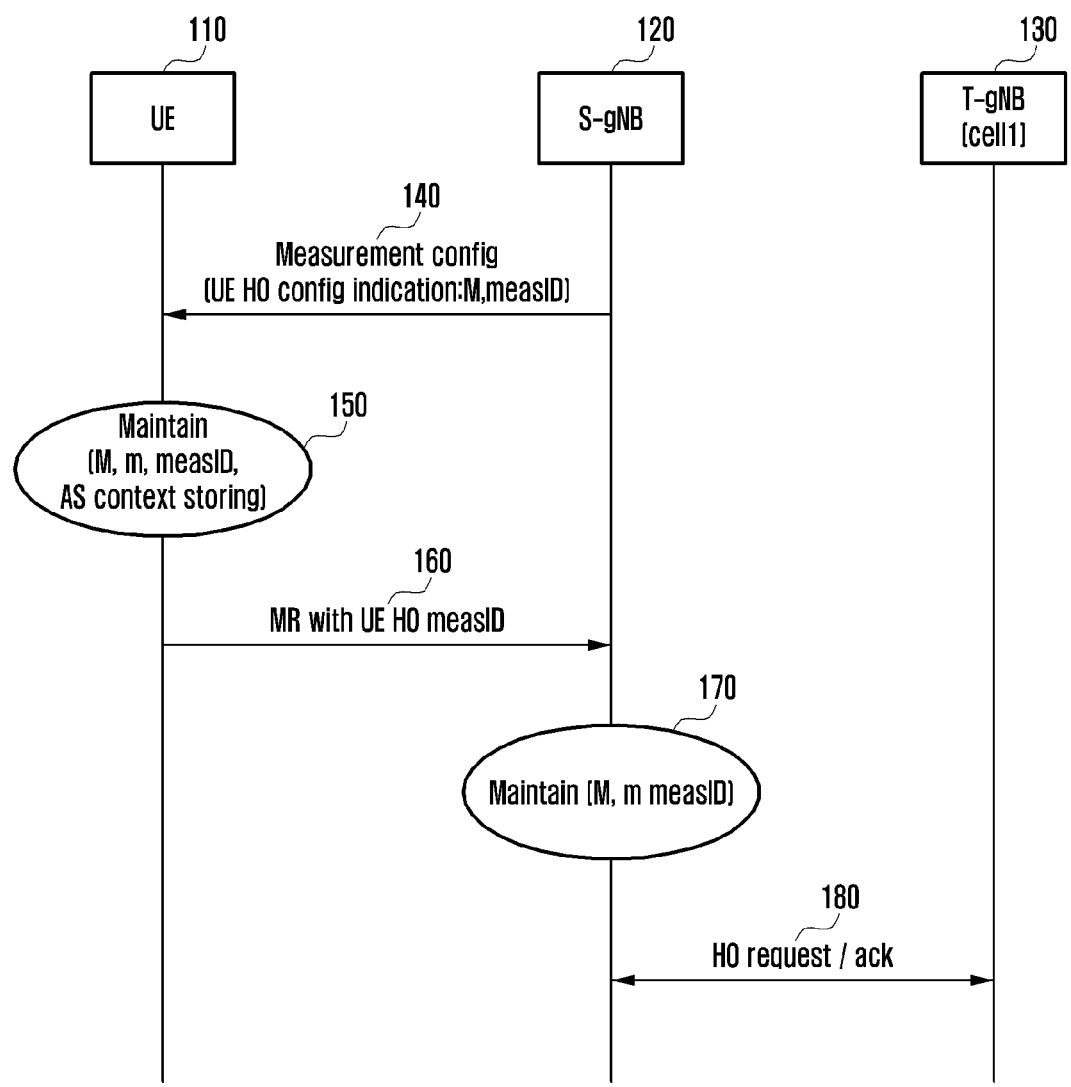

METHOD FOR MEASUREMENT REPORT EVENT OPERATION AND NETWORK SIGNALING IN UE AUTONOMOUS HANDOVER

CROSS-REFERENCE TO RELATED APPLICATIONS

This application is a 371 National Stage of International Application No. PCT/KR2018/005208, filed May 4, 2018, which claims priority to Korean Patent Application No. 10-2017-0057093, filed May 4, 2017, and Korean Patent Application No. 10-2018-0042177, filed Apr. 11, 2018, the disclosures of which are herein incorporated by reference in their entirety.

BACKGROUND

1. Field

Handover described in this patent is UE autonomous handover, and generally refers to handover in which a terminal receives handover configuration signaling to measurement configuration signaling to handover command signaling from a base station and accesses a target base station according to an autonomous determination based on a handover execution condition indicated in the signaling. In addition, network handover refers to handover in which access to a target base station is performed as indicated by a base station when a handover command is received from the base station as in the existing LTE.

2. Description of Related Art

In order to satisfy wireless data traffic demands that tend to increase after the $4^{th}$-generation (4G) communication system commercialization, efforts to develop an enhanced 5G communication system or a pre-5G communication system are being made. For this reason, the 5G communication system or pre-5G communication system is called a beyond 4G network communication system or a post LTE system. In order to achieve a high data transfer rate, the 5G communication system is considered to be implemented in a mmWave band (e.g., 60 GHz band). In order to reduce a loss of electric waves and increase the transfer distance of electric waves in the mmWave band, beamforming, massive MIMO, full dimensional MIMO (FD-MIMO), array antenna, analog beam-forming and large scale antenna technologies are being discussed in the 5G communication system. Furthermore, in order to improve the network of a system, technologies, such as an improved small cell, an advanced small cell, a cloud radio access network (cloud RAN), an ultra-dense network, device to device communication (D2D), wireless backhaul, a moving network, cooperative communication, coordinated multi-points (CoMP) and reception interference cancellation, are being developed in the 5G communication system. In addition, hybrid FSK and QAM modulation (FQAM) and sliding window superposition coding (SWSC) that are advanced coding modulation (ACM) schemes, improved filter bank multi-carrier (FBMC), non-quadrature multiple access (NOMA) and sparse code multiple access (SCMA) are being developed in the 5G system.

The Internet evolves from a human-centered connection network over which human generates and consumes information to Internet of Things (IoT) in which information is exchanged and process between distributed elements, such as things. An Internet of Everything (IoE) technology in which a big data processing technology through a connection with a cloud server is combined with the IoT technology is emerging. In order to implement the IoT, technical elements, such as the sensing technology, wired/wireless communication and network infrastructure, service interface technology and security technology, are required. Accordingly, technologies, such as a sensor network, machine to machine (M2M) and machine type communication (MTC) for a connection between things, are recently researched. In the IoT environment, an intelligent Internet technology (IT) service in which a new value is created for human life by collecting and analyzing data generated from connected things may be provided. The IoT may be applied to fields, such as a smart home, a smart building, a smart city, a smart car or a connected car, a smart grid, health care, smart home appliances, and advanced medical services, through convergence and composition between the existing information technology (IT) and various industries.

Accordingly, various attempts to apply the 5G communication system to the IoT are being made. For example, 5G communication technologies, such as a sensor network, machine to machine (M2M) and machine type communication (MTC), are implemented by schemes, such as beamforming, MIMO, and an array antenna. The application of a cloud wireless access network (cloud RAN) as the aforementioned big data processing technology may be said to be an example of convergence between the 5G technology and the IoT technology.

With the recent development of long term evolution (LTE) and LTE-Advanced, there is a need for a method and apparatus for improving a measurement report/event operation and network signaling in UE autonomous handover.

There is proposed a method of improving a measurement report/event operation and network signaling in UE autonomous handover.

SUMMARY

According to the disclosure, a communication method of a terminal may include transmitting, to a serving base station, a first message including in formation on a candidate target cell, receiving, from the serving base station, a second message including information on a condition for conditional handover related to the candidate target cell, and performing handover to the candidate target cell if a measurement result for the candidate target cell meets the condition for the conditional handover.

Furthermore, the information on the condition for the conditional handover may include at least one of ID information of the candidate target cell, measurement ID information, delta information to which a measurement configuration based on the measurement ID information is to be applied, or access stratum (AS) configuration information to be used if handover to the candidate target cell has been performed.

Furthermore, the method may further include transmitting, to the serving base station, a third message to request the candidate target cell to be removed from a subject of the conditional handover based on the measurement result for the candidate target cell.

Furthermore, in the method, the first message may be transmitted if the currently set number of candidate target cells is smaller than the preset maximum number of candidate target cells.

Furthermore, a communication method of a base station may include receiving, from a terminal, a first message including information on a candidate target cell, transmitting, to the candidate target cell, a second message including configuration request information for conditional handover, receiving, from the candidate target cell, a third message including configuration approval information for the conditional handover, configuring a condition for the conditional handover in which the terminal needs to perform handover to the candidate target cell, and transmitting, to the terminal, a fourth message including information on the condition for the conditional handover related to the candidate target cell.

Furthermore, the method may further include receiving, from the terminal, a fifth message to request the candidate target cell, determined based on a measurement result for the candidate target cell, to be excluded from a subject of the conditional handover.

Furthermore, receiving the first message may include transmitting information on a preset maximum number of candidate target cells to the terminal and receiving the first message if the currently set number of candidate target cells is smaller than the preset maximum number of candidate target cells.

Furthermore, a terminal may include a transceiver and a controller configured to transmit, to a serving base station, a first message including information on a candidate target cell, receive, from the serving base station, a second message including information on a condition for conditional handover related to the candidate target cell, and perform handover to the candidate target cell if a measurement result for the candidate target cell meets the condition for the conditional handover.

Furthermore, a base station may include a transceiver and a controller configured to receive, from a terminal, a first message including information on a candidate target cell, transmit, to the candidate target cell, a second message including configuration request information for conditional handover, receive, from the candidate target cell, a third message including configuration approval information for the conditional handover, configure a condition for the conditional handover in which the terminal needs to perform handover to the candidate target cell, and transmit, to the terminal, a fourth message including information on the condition for the conditional handover related to the candidate target cell.

According to an embodiment of the disclosure, a measurement report/event operation and network signaling in UE autonomous handover can be improved.

BRIEF DESCRIPTION OF THE DRAWINGS

FIG. 1 is a diagram illustrating a measurement report/event operation according to an embodiment of the disclosure.

DETAILED DESCRIPTION

Figure 2A:
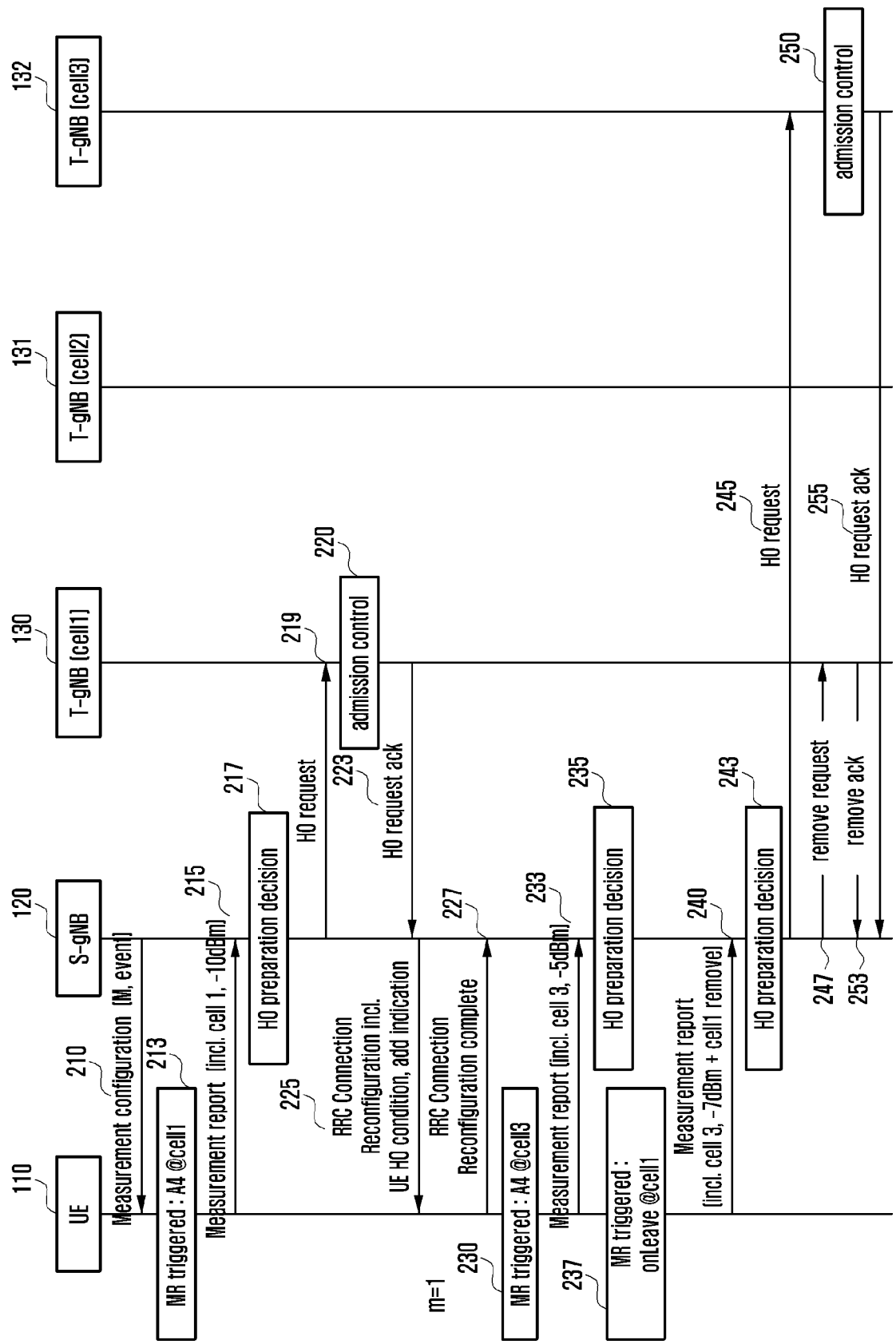
FIG. 2 is a diagram illustrating a measurement report/event operation according to another embodiment of the disclosure.

Hereinafter, embodiments of the disclosure are described in detail with reference to the accompanying drawings. Furthermore, in describing the disclosure, a detailed description of a related known function or configuration will be omitted if it is deemed to make the gist of the disclosure unnecessarily vague. Furthermore, terms to be described hereunder have been defined by taking into consideration functions in the disclosure, and may be different depending on a user, an operator's intention or practice.

The merits and characteristics of the disclosure and a method of achieving the merits and characteristics will become more apparent from the embodiments described in detail in conjunction with the accompanying drawings. However, the disclosure is not limited to the disclosed embodiments, but may be implemented in various different ways. The embodiments are provided to only complete the disclosure and to allow those skilled in the art to fully understand the category of the disclosure. The disclosure is defined by the category of the claims. The same reference numerals will be used to refer to the same or similar elements throughout the drawings.

<Embodiment of M-Based Candidate Cell Operation>

FIG. 1 is a diagram illustrating a measurement report/event operation according to an embodiment of the disclosure.

A base station 120 sets an M value for a given event and notifies a terminal 110 of the set M value through dedicated signaling (Measurement config) (step 140). The given event may correspond to an event that the terminal reports a candidate target cell. M is a maximum m value of candidate target cell managed by the terminal 110 or the base station 120. In this case, a configuration for UE autonomous handover may be indicated in Measurement config configured by the base station 120. The UE autonomous handover configuration may be different from a network handover configuration. The terminal 110 performs an operation of producing a current candidate cell list for the maximum m value M with respect to the corresponding measurement event based on the indication, storing the current candidate cell list, increasing a variable m value by 1 when an entering event is triggered, and decreasing the m value by 1 when a leaving event is triggered (step 150). In this case, the given event may be an event corresponding to a case where a received connection quality value of the target cell is great by a given value, a received connection quality value of the target cell is greater than a received connection quality value of a serving cell by a given value, a received connection quality value of the serving cell is small by a given value, or a received connection quality value of the serving cell is a given value or less and a received connection quality value of the target cell is another given value or more. Furthermore, the given event may be an event corresponding to a case where a given CSI-RS signal of the target cell is a given threshold value or more or a given CSI-RS signal of the serving cell is a given threshold value or less, a given CSI-RS signal of the serving cell is a given value or less and a given CSI-RS signal of the target cell is another given value or more, or a given CSI-RS signal of the target cell is greater than a received signal value of a given CSI-RS of the serving cell by a given threshold value. Furthermore, the given event may be an event corresponding to a case where a received connection quality value of an inter-RAT target cell is a given threshold value or more, a received connection quality value of a Pcell is a given threshold value or less, or a received connection quality value of an inter-RAT target cell is another given threshold value or more.

In this case, a reference signal for measuring the connection quality of the cell is defined in a measurement configuration, and may be a synch signal, a cell specific reference signal (CRS), or a channel state information reference signal (CSI-RS).

If a value of m does not exceed M when the given event occurs, the terminal 110 may transmit a measurement report (MR) signal, including candidate target cell information satisfying the given event, to the base station 120 (steps 160 and 170). Specifically, when the corresponding event is triggered, the terminal 110 stores the cell 111) of an event target cell (this means a neighbor cell in A3 or A4, a neighbor cell having a value greater than a threshold value in A5, a neighbor cell having a value greater than a threshold value of an Scell in A6, a cell that has transmitted a CSI-RS in which an event has occurred in C1 or C2, or a neighbor cell having a value better than a threshold value in B1 or B2) 130, and transmits the measurement report (MR) to the base station 120. The MR signal may include at least one of the ID of a candidate target cell that meets the given event, the beam index of a candidate target cell 130, the received signal intensity of the candidate target cell, the ID of another surrounding cell, the beam index of a surrounding cell, or the received signal intensity of the surrounding cell. The base station 120 that has received the MR signal may identify whether the candidate target cell may become the candidate target cell 130 for the terminal 110 by performing a negotiation procedure with the candidate target cell 130 (step 180). A HO request/ack signal may be used in the negotiation procedure between the base stations.

Figure 2B:
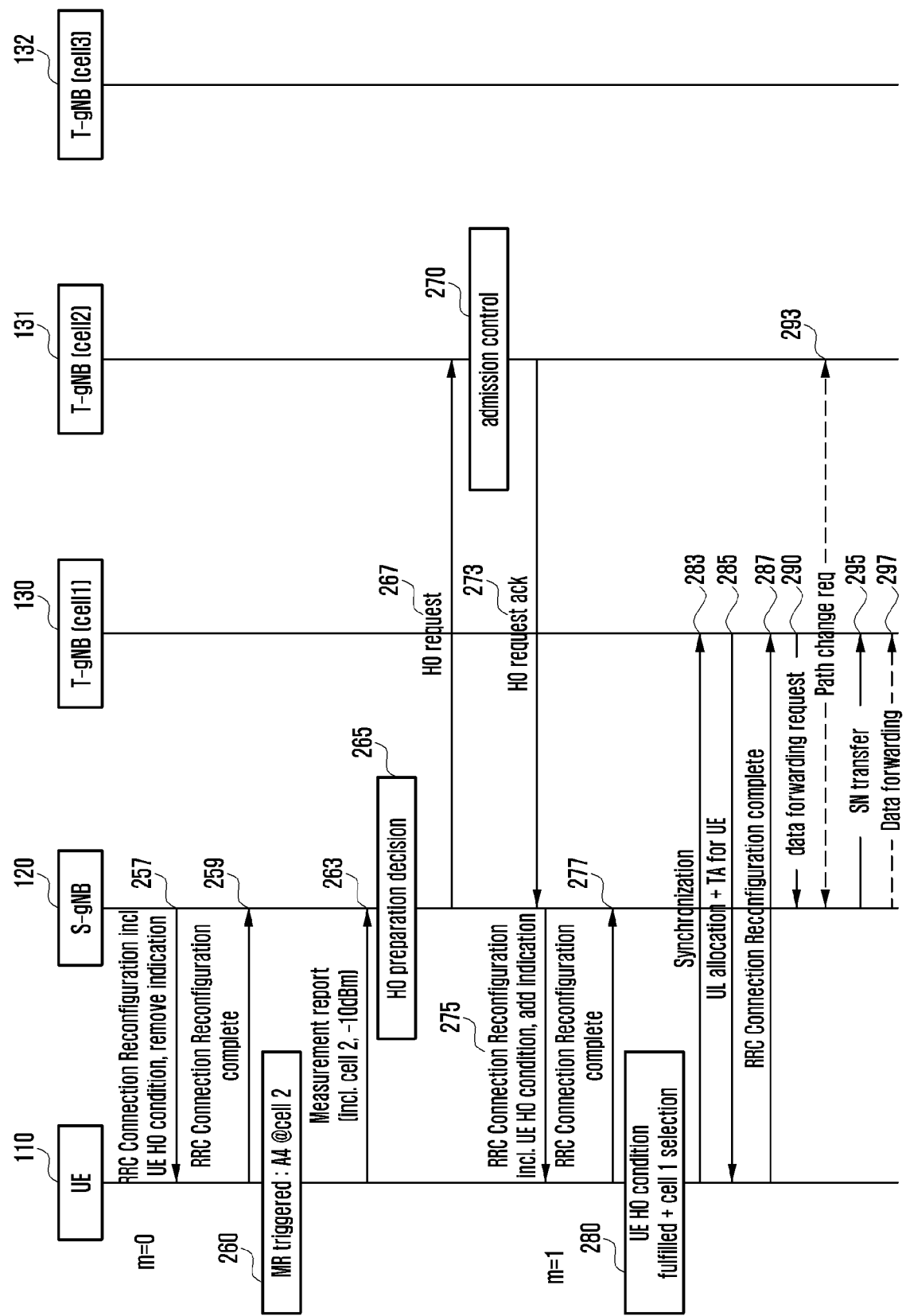

FIG. 2 is a diagram illustrating a measurement report/event operation according to another embodiment of the disclosure.

A serving base station 120 may transmit, to a terminal 110, a measurement configuration signal including at least one of M indicative of a maximum number of candidate target cells, an event in which a UE autonomous handover usage measurement report will be performed, an entering condition for the event, or a leaving condition for the event (step 210).

If an entering condition for the corresponding event is met (step 213, step 230) when the terminal 110 makes a measurement report, the terminal may make a measurement report (step 215, step 233). If the terminal 110 receives, from the serving base station 110, a confirmation signal so that a cell ID meeting the entering condition is included in a candidate target cell list, the terminal increases an m value by 1 (steps 217, 219, 220, 223, 225, 227, 245, 250, 255, 257, 259). If the m has reached an M value, the terminal does not make a measurement report for any cell that initiates a corresponding event.

If the leaving condition for the corresponding set event is met (step 237), the terminal 110 transmits a measurement report for the corresponding event to the serving base station 120 again (step 240). If the terminal 110 receives, from the serving base station 120, confirmation signaling by which the ID of a cell meeting the event is deleted from the candidate target cell list, the terminal deletes the ID of the cell meeting the leaving condition and decreases the m value by 1 (steps 243, 247, 253, 257, 259).

If the m value is equal to the M, the terminal 110 omits a report or does not make a report for a cell newly triggered by a corresponding event.

If there is a cell on which the terminal 110 has not performed MR transmission although m reaches M and an event is met, thereafter, if the m value is reduced and smaller than the M at any timing (the m value becomes smaller than M if a measurement report is transmitted and a confirmation signal is received with respect to a cell meeting a leaving condition) or if the in value may become smaller than M (when a measurement report is transmitted with respect to a cell meeting a leaving condition), if a corresponding cell still meets a condition in which an event is triggered at current timing (the state in which an entering condition has been met before a time to trigger time based on a current time) (step 260), the terminal 110 may transmit, to the serving base station 120, an MR including corresponding cell information (a cell ID, the received signal intensity of the cell) (steps 263, 265, 267, 270, 273, 275, 277).

For reference, the terminal 110 increases the m value with reference to target cell addition information (cell ID, indicates that a target cell has been added) included in the confirmation signal, and decreases the m value based on cell release or information (cell ID, indicates that a target cell has been removed) indicating that a target cell has been removed. If a cell ID is included in a confirmation signal without indication for a target cell added or removed, the terminal 110 may increase the m value when receiving a cell ID that has transmitted an MR for addition through a confirmation signal, and may decrease the m value when transmitting an MR for a cell to be removed (meeting a leaving condition).

In FIG. 2, the confirmation signal may correspond to an RRC connection reconfiguration in step 225 or 257 or 275. The terminal 110 may transmit an ack signal for the confirmation signal in step 227 or 259 to 277.

The serving base station 120 may indicate a handover event which may be applied when the terminal 110 performs UE autonomous handover on one of candidate target cells through signaling in step 210 or 225 or 257 or 275. If a target cell meeting the handover event indicated through the signaling of the serving base station 120 in step 210 or 225 or 257 or 275 is discovered among the candidate target cells, the terminal 110 may perform handover to the target cell (step 280). The access procedure for the target cell 132 corresponds to a step after the synchronization step (step 283) of FIG. 2b.

Figure 3:
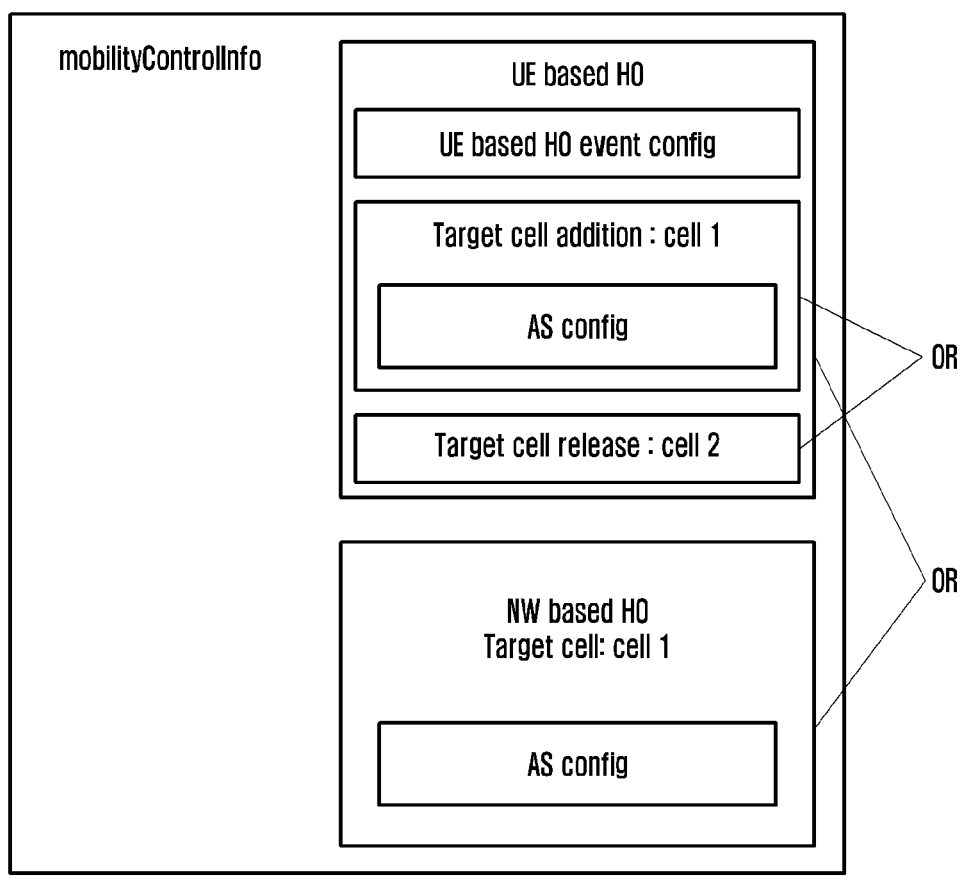
FIG. 3 is a diagram illustrating mobilityControlInfo according to an embodiment of the disclosure.

FIG. 3 is a diagram illustrating mobilityControlInfo according to an embodiment of the disclosure.

A mobilityControlInfo IE may be included in the signaling corresponding to step 210 or 225 or 257 or 275 of FIG. 2. The mobilityControlInfo IE is used to configure at least one of a measurement configuration for UE autonomous handover or NW handover a handover configuration necessary to perform handover on one of candidate target cells to a handover configuration for a target cell. Specifically, the mobilityControlInfo IE first includes a factor to identify whether corresponding information is based on network handover or UE autonomous handover. If the corresponding information is a UE autonomous-based factor, it indicates whether the UE autonomous-based factor is a target cell addition or a target cell release, and may indicate a target cell ID. The mobilityControlInfo IE may include a condition for UE HO execution along with the addition and release indication. The condition for UE HO execution may be the same as the event for MR transmission described in FIG. 1. One or more handover execution conditions may be included. If the number of handover execution conditions is plural, the plurality of handover execution conditions may be used at the same time. If a handover execution event is newly transmitted by the serving base station 120, the terminal 110 may overwrite a previously received UE HO execution condition. In a next structure, in the case of a target cell addition, the mobilityControlInfo IE may transmit resource configuration information in a target cell which is necessary for the terminal 110 to perform handover. If the terminal 110 is configured with network-based HO based on the mobilityControlInfo IE, the terminal performs network-based HO based on given AS configuration information. If the terminal is configured with UE-based HO, the terminal determines whether a target cell is added or released. If the target cell is to be added, the terminal stores resource configuration information for the corresponding add target cell. The existing stored configuration information of the cell may be overwritten with new configuration information if the terminal 110 subsequently receives the new configuration information as target cell addition of UE-based HO through a mobilityControlInfo IF. In this case, the terminal 110 may also store all types of current AS configuration information of the terminal. If UE-based HO is performed and a corresponding target cell is a cell that has previously stored AS configuration information, the terminal 110 may access the target cell based on the stored configuration information and use the information for a connection. A MobilityControlInfo IE-based measurement configuration to a handover configuration-related operation may be used for an M update without any change.

Figure 4:
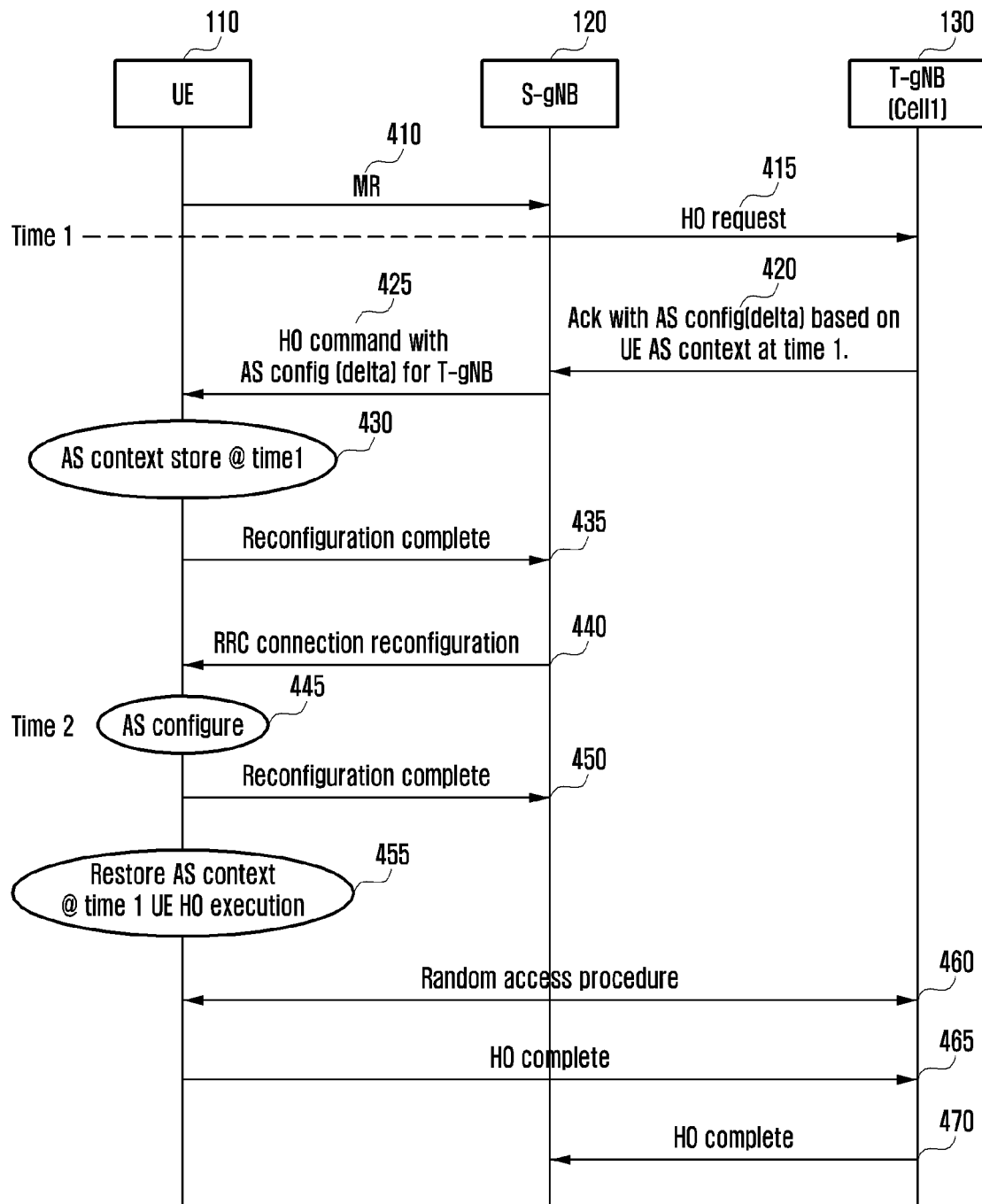
FIG. 4 is a diagram illustrating a handover operation according to an embodiment of the disclosure.

FIG. 4 is a diagram illustrating a handover operation according to an embodiment of the disclosure.

A terminal 110 transmits an MR based on an event indicated by a serving base station 120. The serving base station 120 transmits an HO request to an adjacent base station 130 that may become a candidate target cell (step 410, step 415). If the corresponding adjacent base station 130 is identified to be capable of becoming a candidate target cell, it transmits ACK to the serving base station (step 420). The adjacent base station 130 may provide AS configuration information which may be used for the terminal 110 to access the corresponding base station 130 along with the ACK. The AS configuration information may be delta information or full AS configuration information of UE AS context in a Time 1. The serving base station 120 instructs the terminal 110 to add the adjacent base station 130 as a candidate target cell and also transmits the AS configuration information, received from the adjacent base station 130, to the terminal 110 (step 425). The terminal 110 transmits a reconfiguration complete signal to the serving base station 120, and may store the received AS configuration of the adjacent base station 130 (step 430, step 435). That is, in the state in which the candidate target cell and the configuration information in the candidate target cell are maintained in the terminal 110 and UE autonomous HO has not yet been performed, if an RRC connection reconfiguration not handover indication is transmitted by the serving base station 120, the terminal 110 is aware that the RRC connection reconfiguration is a configuration for the serving cell and performs the AS configuration based on corresponding reconfiguration information.

Thereafter, the serving base station 120 may transmit an RRC connection reconfiguration (step 440). The RRC connection reconfiguration may include AS configuration change information in the serving cell. The terminal 110 transmits a reconfiguration complete signal to the serving base station 120, and may reconfigure the AS context of the serving cell based on the received AS configuration (step 445, step 450). Thereafter, if a handover event for the T-gNB 130 occurs, the terminal 110 may perform a connection configuration for the corresponding target base station 130 using the AS configuration information of the T-gNB stored in the Time1 (step 455). The terminal 110 may perform a random access procedure with the T-gNB 130 (step 460). If the connection configuration procedure is completed, the terminal 110 may transmit a HO complete signal to the T-gNB 130 (step 465). The T-gNB 130 that has received the HO complete signal may notify the serving base station 120 of the HO complete of the terminal 110 (step 470).

In the case of an AS configuration for UE autonomous HO, the terminal 110 stores all types of AS configuration information of the terminal 110 at timing when a corresponding configuration is performed in addition to the configuration (full configuration or delta configuration) performed by a target cell through a HO command. Accordingly, when UE autonomous HO is performed, the terminal 110 accesses a corresponding target cell based on AS configuration information stored in each target cell.

Figure 5A:
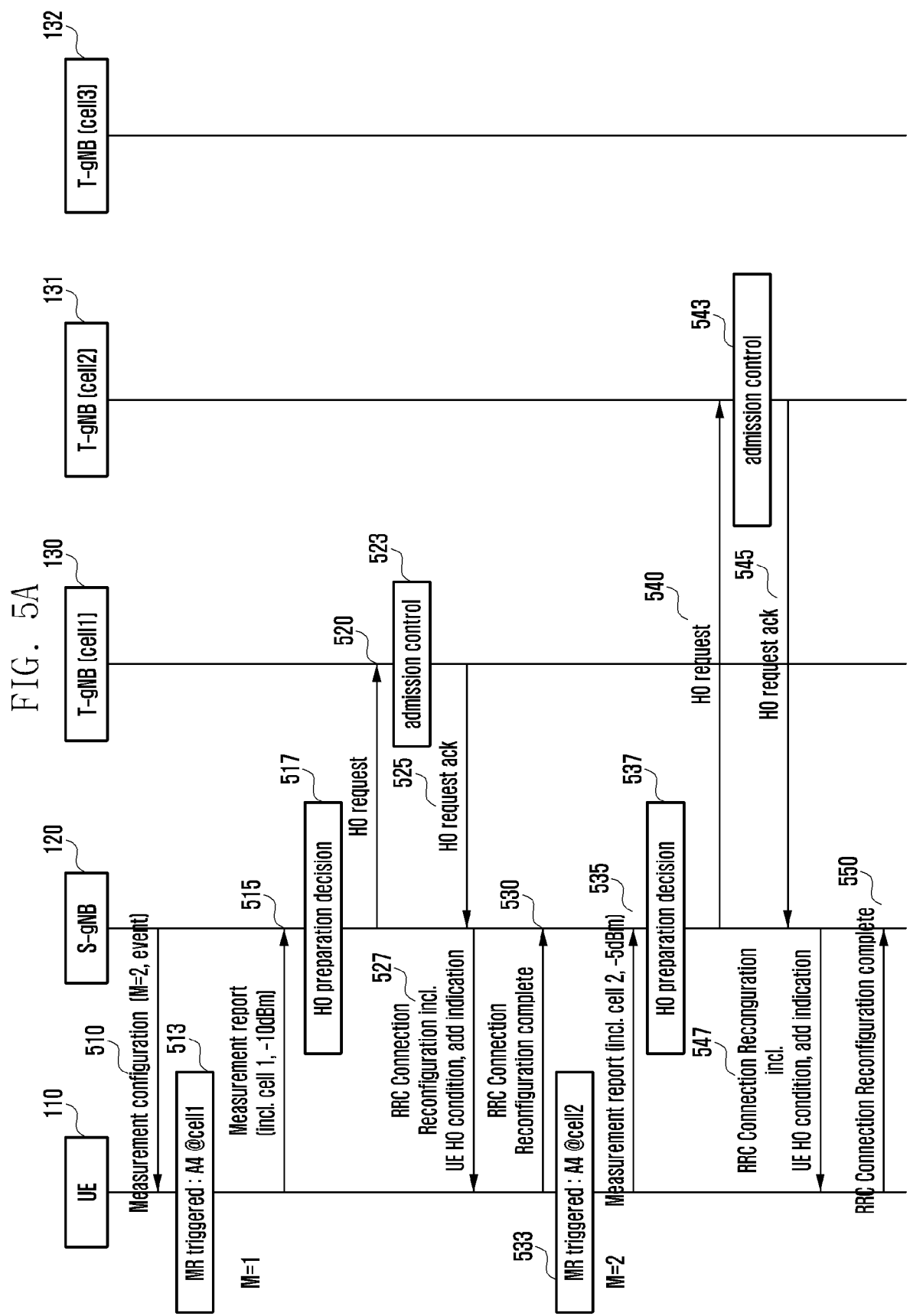
FIG. 5 is a diagram illustrating a handover operation according to another embodiment of the disclosure.
Figure 5B:
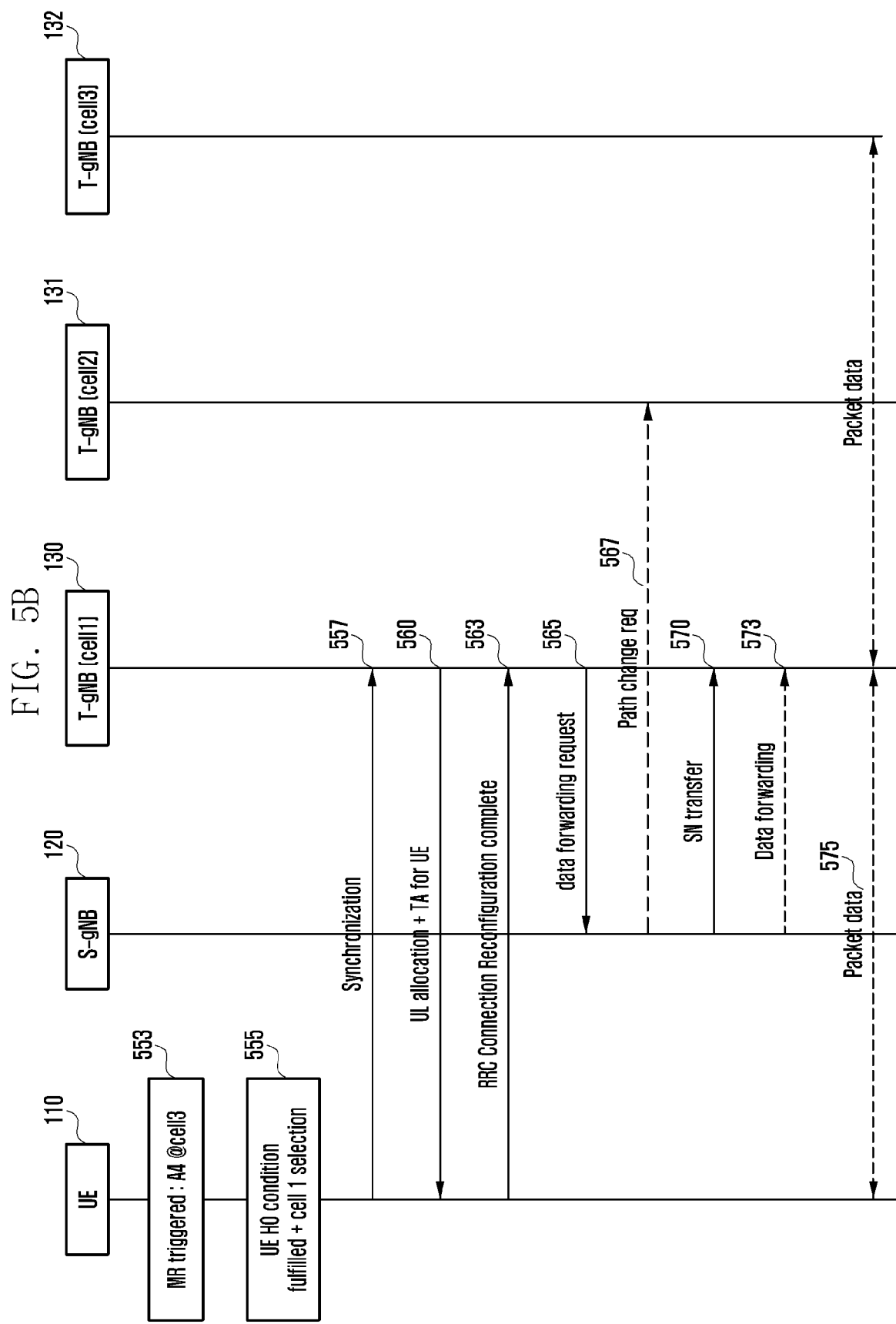

FIG. 5 is a diagram illustrating a handover operation according to another embodiment of the disclosure.

An M value is set as a maximum number at which a terminal 110 transmits an MR because an event for target cell addition is triggered. A serving base station 120 indicates, with respect to the terminal 110 at least one of an M value, an event for UE autonomous HO, a candidate target cell addition condition or leaving condition, or an event for NW based HO through measurement configuration signaling (step 510). The terminal 110 may identify whether an adjacent base station meeting a candidate target cell addition condition is discovered based on the event for UE autonomous HO indicated in the measurement configuration by performing received signal intensity measurement for the serving cell and a neighbor cell. If an adjacent base station 130 meeting the candidate target cell addition condition is discovered and the m value is not greater than an M value, the terminal 110 increases the m value by 1. The terminal 110 transmits, to the serving base station 120, an MR including information on the adjacent base station 130 meeting the candidate target cell addition condition (step 513, step 515). The MR includes at least one of the cell ID of the adjacent base station 130, the beam index of the adjacent base station 130, the received signal intensity of the adjacent base station 130, the cell ID of a different adjacent base station, the beam index of the different adjacent base station, or the received signal intensity of the different adjacent base station. The serving base station 120 and the adjacent base station 130 may identify a candidate target cell of the terminal 110 by exchanging an HO request and an HO request ack based on the MR of the terminal 110 (steps 517, 520, 523, 525). The serving base station 120 performs an RRC connection reconfiguration/RRC connection reconfiguration complete procedure in order to provide identified candidate target cell information to the terminal 110 (step 527, step 530). Thereafter, if a new neighbor cell 131 meeting the candidate target cell addition condition is identified to be present based on a configured event, the terminal 110 identifies whether the m value is not greater than the M value, and may transmit an MR to the serving base station 120 if the m value is not greater than the M value (step 533, step 535). The MR includes at least one of the cell ID of the new adjacent base station 131, the beam index of the new adjacent base station 131, the received signal intensity of the new adjacent base station 131, the cell ID of a different adjacent base station, the beam index of the different adjacent base station, or the received signal intensity of the different adjacent base station. The serving base station 120 and the adjacent base station 131 may identify a candidate target cell of the terminal 110 by exchanging an HO request and an HO request ack based on the MR of the terminal 110 (steps 537, 540, 543, 545). The serving base station 120 performs an RRC connection reconfiguration/RRC connection reconfiguration complete procedure in order to provide determined candidate target cell information to the terminal 110 (step 547, step 550). If a new neighbor cell 132 meeting the candidate target cell addition condition is identified to be present based on a configured event, when the m value is greater than the M value, the terminal 110 does not perform MR transmission although the target cell addition condition is met (step 553).

If the leaving condition of an event configured for a cell ID included in a candidate target cell list is met, the terminal 110 transmits an MR to the serving base station 120. The MR includes at least one of the ID of an neighbor cell meeting the candidate target cell leaving condition, the received signal intensity of the neighbor cell, the beam index of the neighbor cell, the ID of a different neighbor cell, the beam index of the different neighbor cell, or the received signal intensity of the different neighbor cell. The serving base station 120 performs a candidate cell removal procedure with the corresponding cell meeting the candidate target cell leaving condition, and transmits result information to the terminal 110. That is, the result information includes a target cell ID for which candidate cell removal is indicated along with UE autonomous handover indication. If the terminal 110 already stores the target cell ID as a current candidate cell based on the indication, it removes the ID and stored configuration information from the candidate cell list. In another embodiment, if one cell is removed from the candidate target cell, the terminal 110 may decrease the m value by 1. If a UE autonomous handover event execution condition is met with respect to the candidate target cell (step 555), the terminal 110 may identify the corresponding cell as the target base station 130 and perform a connection reconfiguration procedure on the cell. The connection reconfiguration procedure for the target base station 130 corresponds to a step after a synchronization procedure (steps 557, 560, 563, 565, 567, 570, 573, 575).

<In Another Embodiment, a Serving Base Station Manages a Candidate Target Cell for UE Autonomous HO by Managing an M Value and Adjusting a Value an Event>

A serving base station 120 may indicate a candidate target cell configuration event, a candidate target cell addition condition and a candidate target cell leaving condition with respect to a terminal 110. The serving base station 120 manages a maximum number of candidate target cells that may be managed with respect to the terminal 110, that is, an M value. That is, the terminal 110 does not need to manage the M value, and only the serving base station 120 manages the M value. The terminal 110 transmits an MR according to an event indicated by the serving base station 120. In a process for the serving base station 120 to identify a candidate target cell based on the MR of the terminal 110, the serving base station 120 identifies whether the number of candidate target cells for the terminal 110 exceeds the M value. If the number of candidate target cells is greater than the M value, the serving base station 120 may indicate the re-adjustment of an addition condition or an event re-adjusted with respect to the terminal 110 so that the terminal 110 reduces candidate target cell addition. If the number of candidate target cells is greater than the M value, the serving base station 120 may indicate the re-adjustment of a leaving condition or an event re-adjusted with respect to the terminal 110 so that the terminal 110 increases candidate target cell leaving. That is, the serving base station 120 adjusts the parameter (factor) of a candidate target cell addition/deletion event and indicates a new event configuration for the terminal 110 so that a candidate cell corresponding to the M value is maintained.

Embodiments of various options for adjusting the event are as follows.

Option 1. When the number of candidate cells is M, a value of an event is adjusted in order to maintain the M value and a new event1 configuration is indicated in the terminal 110. For example, if M candidate cells are maintained, the serving base station 120 raises a threshold value of an event inch an MR is transmitted, for example, a threshold value in the case of A4, configures the threshold value, and transmits it to the terminal 110.

Option 2. When the number of candidate cells becomes 1, a value of an event is adjusted in order to maintain an M value, and a new event1 configuration is indicated in the terminal 110. For example, when the number of candidate cells becomes 1, the serving base station 120 decreases a threshold value of an event in which an MR is transmitted, for example, a threshold value in the case of A4, and configures the threshold value in the terminal 110. Accordingly, the possibility that the terminal 110 will perform an operation of transmitting an addition MR is increased.

Option 3. When the number of candidate cells becomes M, the serving base station 120 may instruct the terminal 110 to not perform additional transmission of an MR corresponding to a corresponding event.

<An Embodiment in which a Serving Base Station May Perform Cell Addition Based on the Cell ID of a Different Neighbor Cell and Cell Quality Information of the Different Neighbor Cell Reported by a Terminal if a Leaving Condition for a Candidate Target Cell is Met is Described Below>

If an event meeting a leaving condition occurs among neighbor cells included in a current candidate target cell list, a terminal 110 transmits an MR to the serving base station 120. In this case, the terminal may transmit the MR, including the cell ID of a cell meeting a pre-defined candidate target cell addition condition, among neighbor cells, and a cell quality value, to the serving base station 120. The serving base station 120 may identify whether a neighbor cell not included in the current candidate target cell list meets the cell addition condition based on the MR. If a neighbor cell meeting the cell addition condition is present, the serving base station 120 performs a negotiation for candidate cell addition on the corresponding cell, and may instruct the terminal 110 to add the candidate cell as a candidate target cell.

In another embodiment, when cell addition is performed based on an MR transmitted when a candidate target cell leaving condition occurs, reliability in adding a corresponding neighbor cell to a candidate target cell may be degraded because the neighbor cell may not meet a time to trigger (TTT) for meeting a cell addition event. Accordingly, the terminal 110 may transmit an MR along with each cell ID, cell quality and an indicator notifying whether TTT is met when information of another neighbor cell is included in the MR that reports a cell ID meeting a leaving condition.

The serving base station 120 may perform a negotiation for adding a cell, meeting bath a cell addition condition and a TTT condition, as a candidate cell. The base station 120 may indicate that the cell should be added to a candidate target cell list by transmitting the added cell information to the terminal 110.

<An Embodiment of a Case where a Cell Addition MR and a Cell Leaving MR Overlap>

Figure 6:
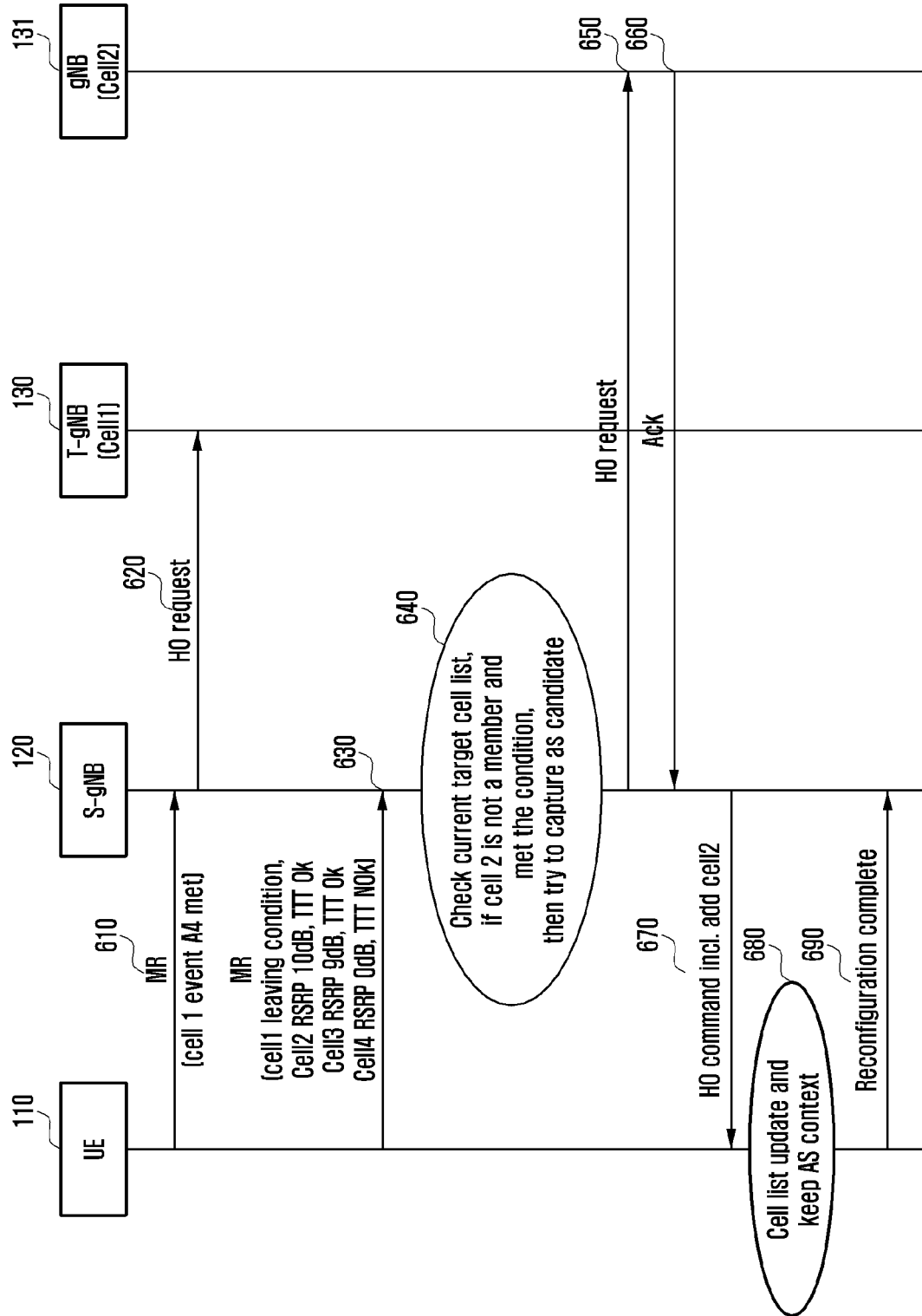
FIG. 6 is a diagram illustrating an embodiment of a case where a cell addition MR and a cell leaving MR overlap.

FIG. 6 is a diagram illustrating an embodiment of a case where a cell addition MR and a cell leaving MR overlap.

A terminal 110 may be in the state in which the terminal has not received a HO command (or RRC reconfiguration with mobilityControlInfo) from a serving base station 120 (step 620) after transmitting a cell addition MR to the serving base station 120 (step 610). Furthermore, in the state in which the terminal 110 has not received the Ho command, it may measure the channels of surrounding base station and transmit a cell leaving MR to the serving base station 120 because a condition for leaving is met among surrounding base stations (step 630). In such a case, the serving base station 120 may receive a cell adding MR and a cell leaving MR from the terminal 110 before it transmits a handover command. The serving base station 120 may identify a candidate cell to be finally used by the terminal 110 based on base station information included in the cell adding MR and cell leaving MR (step 640). In such a case, the serving base station 120 does not transmit a handover command with respect to each of the cell adding MR and the cell leaving MR, and may transmit the final candidate cell information by transmitting a single handover command to the terminal 110 (steps 650, 660, 670). Furthermore, after receiving the handover command, the terminal 110 may transmit RRC Reconfiguration Complete to the serving base station 120 (steps 680, 690).

Figure 7:
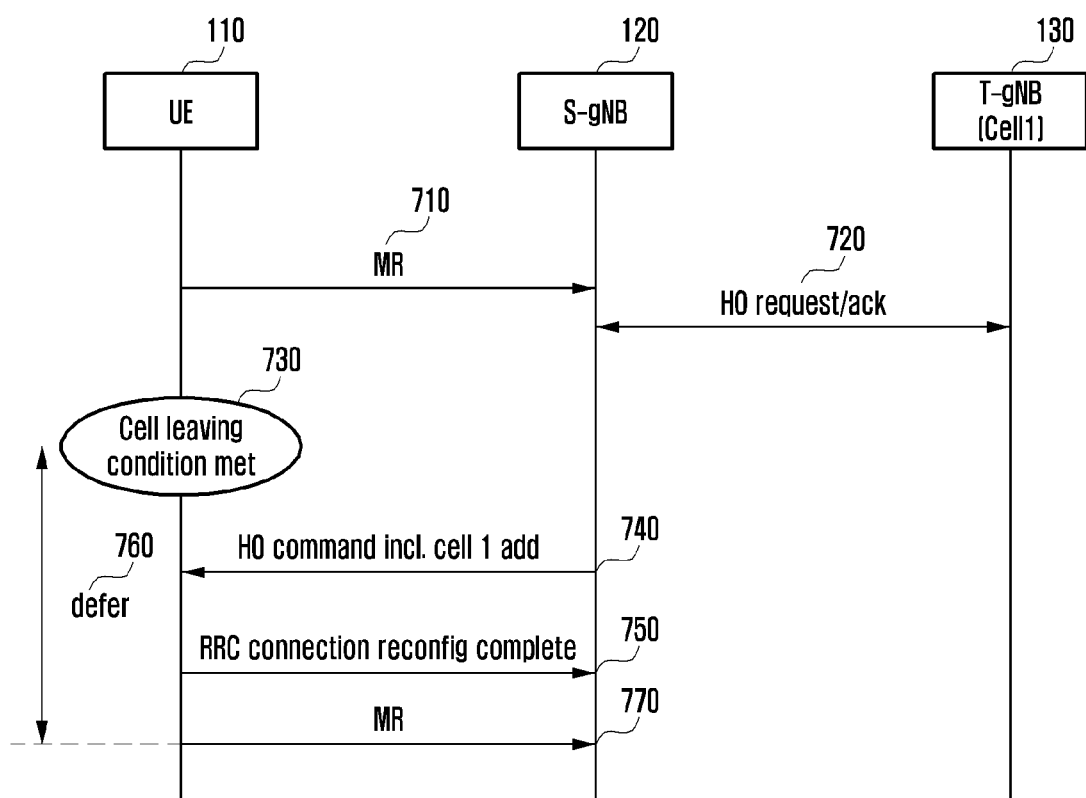
FIG. 7 is a diagram illustrating an embodiment in which a cell laving MR is processed after cell addition MR transmission.

FIG. 7 is a diagram illustrating an embodiment in which a cell leaving MR is processed after cell addition MR transmission.

After a terminal 110 measures the channel of a surrounding base station 120, it may transmit a cell addition MR to the serving base station 120 after a cell addition MR transmission condition is met (step 710). After the cell addition MR transmission to the serving base station 120, the terminal 110 may be in the state in which it has not received a HO command (e.g., an RRC reconfiguration with mobilityControlInfo) (step 720). Furthermore, the terminal 110 may need to transmit a cell leaving MR to the serving base station 120 because a cell leaving MR transmission condition is met after the terminal 110 measures the channels of surrounding base stations in the state in which the terminal has not receive a HO Command (step 730). In such a case, the terminal 110 may defer the cell leaving MR until it transmits RRC reconfiguration complete for a cell adding MR to the serving base station 120 (step 760). For example, after the terminal 110 transmits a cell addition MR to the serving base station 120 and transmits RRC reconfiguration complete corresponding to the cell addition MR (step 740, 750), the terminal 110 may transmit a cell leaving MR to the serving base station 120 (step 770).

Figure 8:
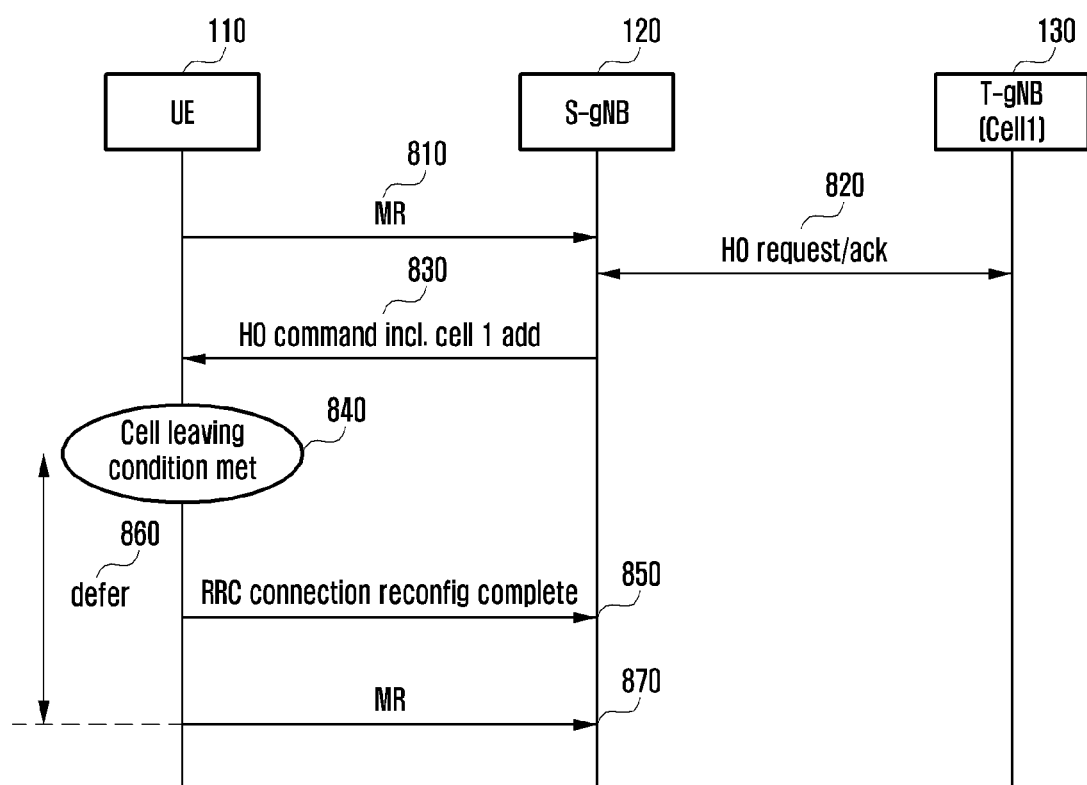
FIG. 8 is a diagram illustrating another embodiment in which a cell leaving MR is processed after cell addition MR transmission.

FIG. 8 is a diagram illustrating another embodiment in which a cell leaving MR is processed after cell addition MR transmission.

After a terminal 110 identifies whether a condition for the cell adding MR transmission of a surrounding base station to a serving base station 120 is met, the terminal may transmit a cell adding MR (step 810). After the terminal 110 transmits the cell adding MR to the serving base station 120, the terminal 110 may receive HO command incl. cell add. (e.g., RRC reconfiguration with mobilityControlInfo) from the serving base station 120 (steps 820, 830). After the terminal 110 receives the HO command, the terminal may be in the state in which it has not transmitted an RRC Reconfiguration complete message to the serving base station 120. Furthermore, in the state in which the terminal 110 has not transmitted the RRC Reconfiguration complete message, the terminal may has to measure the channel of a surrounding base station, identify whether a condition for cell leaving MR transmission is met, and then transmit a cell leaving MR (step 840). In such a case, the terminal 110 may defer the cell leaving MR until it transmits RRC reconfiguration complete related to the cell adding MR (step 860). For example, after the terminal 110 transmits a cell adding MR to the serving base station 120 and RRC reconfiguration complete corresponding to the cell adding MR is performed (step 850), the terminal 110 may transmit the cell leaving MR to the serving base station 120 (step 870).

Figure 9:
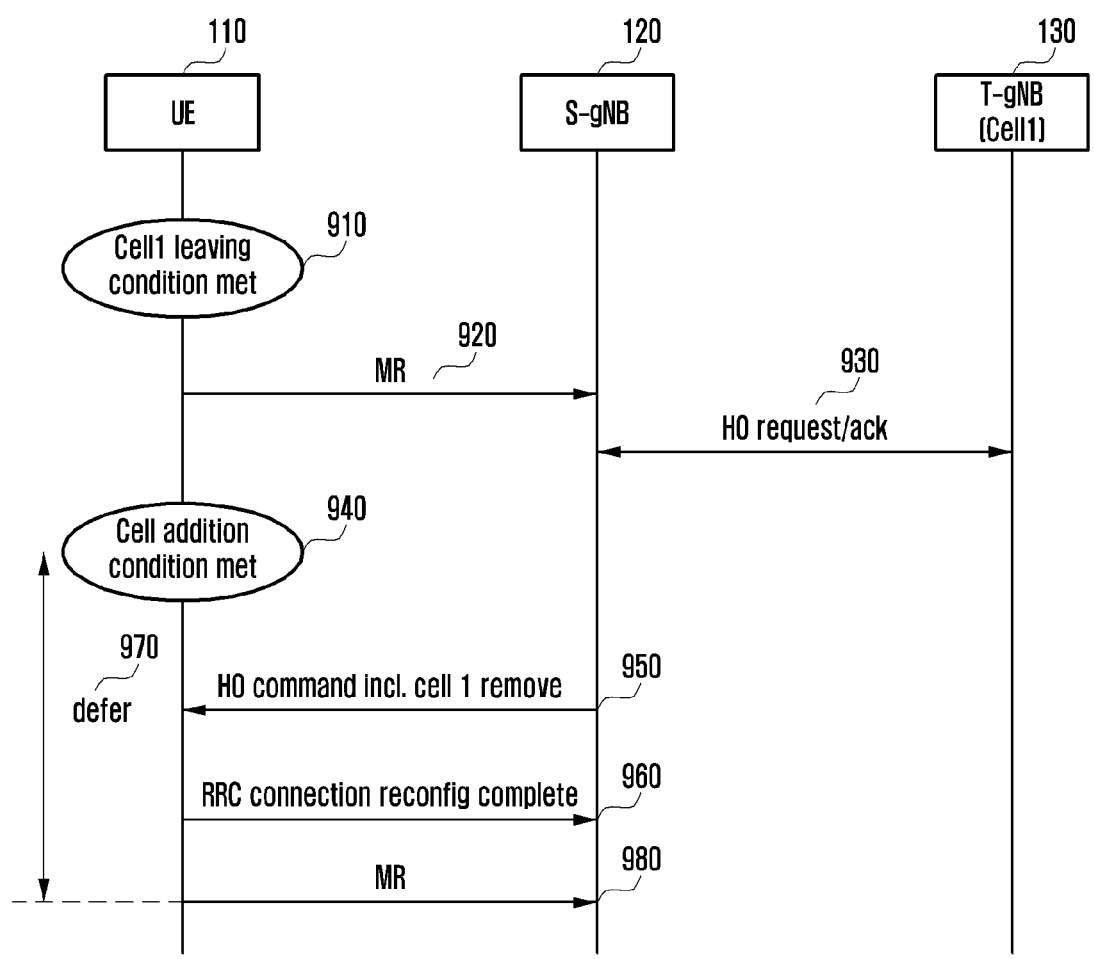
FIG. 9 is a diagram illustrating another embodiment in which a cell leaving MR is processed after cell addition MR transmission.

FIG. 9 is a diagram illustrating yet another embodiment in which a cell leaving MR is processed after cell addition MR transmission.

A terminal 110 may identify whether a cell leaving MR transmission condition for a surrounding base station to a serving base station 120 is met. If the condition is met, the terminal 110 may transmit a cell leaving MR (step 910, 920). The terminal 110 may be in the state in which it has not received a HO command (e.g., RRC reconfiguration with mobilityControlInfo) from the serving base station 120 after transmitting the cell leaving MR (step 930). Furthermore, in the state in which the terminal 110 has not received the HO command from the serving base station 120, the terminal 110 may have to transmit a cell addition MR to the serving base station 120 because a cell addition MR transmission condition is met after the terminal measures the channels of surrounding base stations (step 940). In such a case, the terminal 110 may defer a cell addition MR operation (step 970) until it transmits RRC reconfiguration complete for a cell leaving MR to the serving base station 120 (steps 950, 960). For example, after the terminal 110 transmits a cell leaving MR to the serving base station 120 and transmits RRC reconfiguration complete corresponding to the cell leaving MR (step 960), the terminal 110 may transmit the cell addition MR to the serving base station 110 (step 980).

Figure 10:
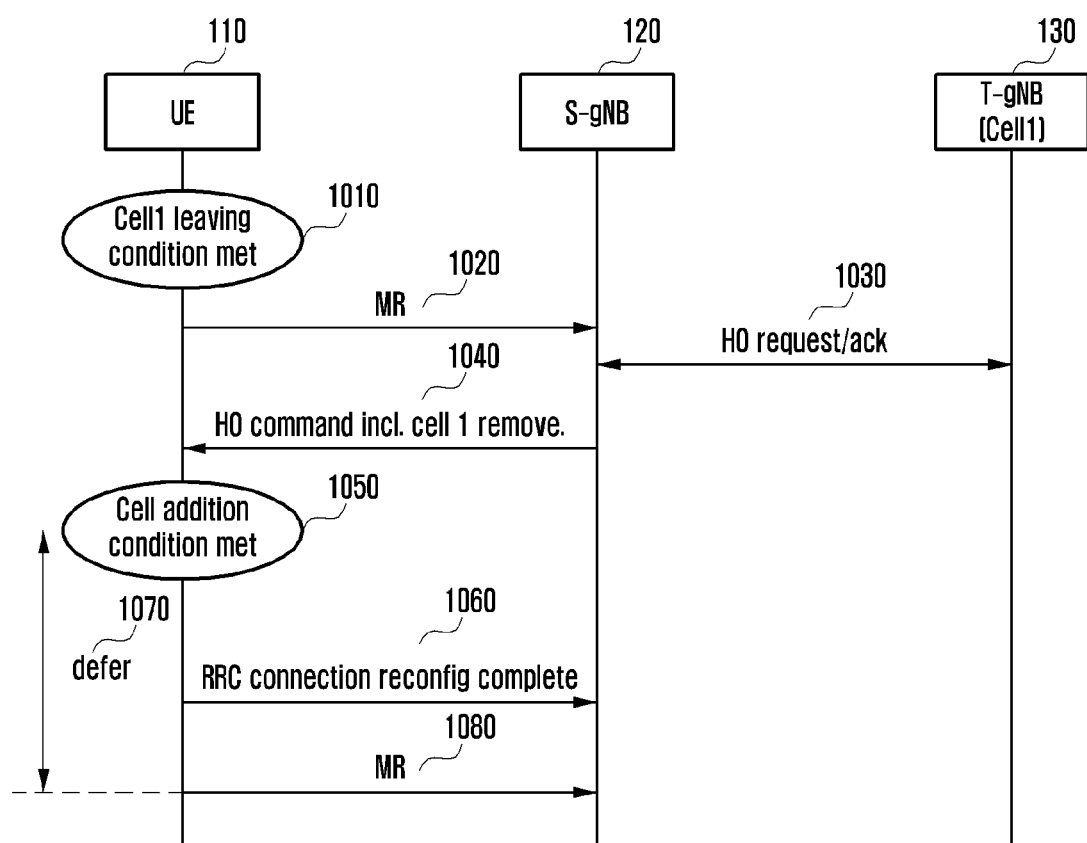
FIG. 10 is a diagram illustrating yet another embodiment in which a cell leaving MR is processed after cell addition MR transmission.

FIG. 10 is a diagram illustrating yet another embodiment in which a cell leaving MR is processed after cell addition MR transmission.

A terminal 110 may identify whether the cell leaving MR transmission condition of a surrounding base station to a serving base station 120 is met, and may transmit a cell leaving MR if the condition is met (steps 1010, 1020). After transmitting the cell leaving MR, the terminal 110 may receive an HO command (e.g., RRC reconfiguration with mobilityControlInfo) from the serving base station 120 (steps 1030, 1040). Furthermore, after receiving the HO command, the terminal 110 may be in the state in which it has not transmitted RRC reconfiguration complete. In the state in which the terminal 110 has not transmitted the RRC reconfiguration complete, the terminal 110 may have to transmit a cell addition MR to the serving base station 120 because a cell addition MR transmission condition is met after the terminal measures the channels of surrounding base stations (step 1050). In such a case, the terminal 110 may defer a cell addition MR operation until it transmits RRC reconfiguration complete for the cell leaving MR to the serving base station 120 (step 1070). For example, after the terminal 110 transmits the cell leaving MR to the serving base station 120 and transmits RRC reconfiguration complete corresponding to the cell leaving MR (step 1060), the terminal 110 may transmit the cell addition MR to the serving base station 120 (step 1080).

<An Embodiment of an Operation for a Terminal to Process a Candidate Cell and MR Configuration Used Upon Communication with a Serving Cell after Performing Handover>

Figure 11:
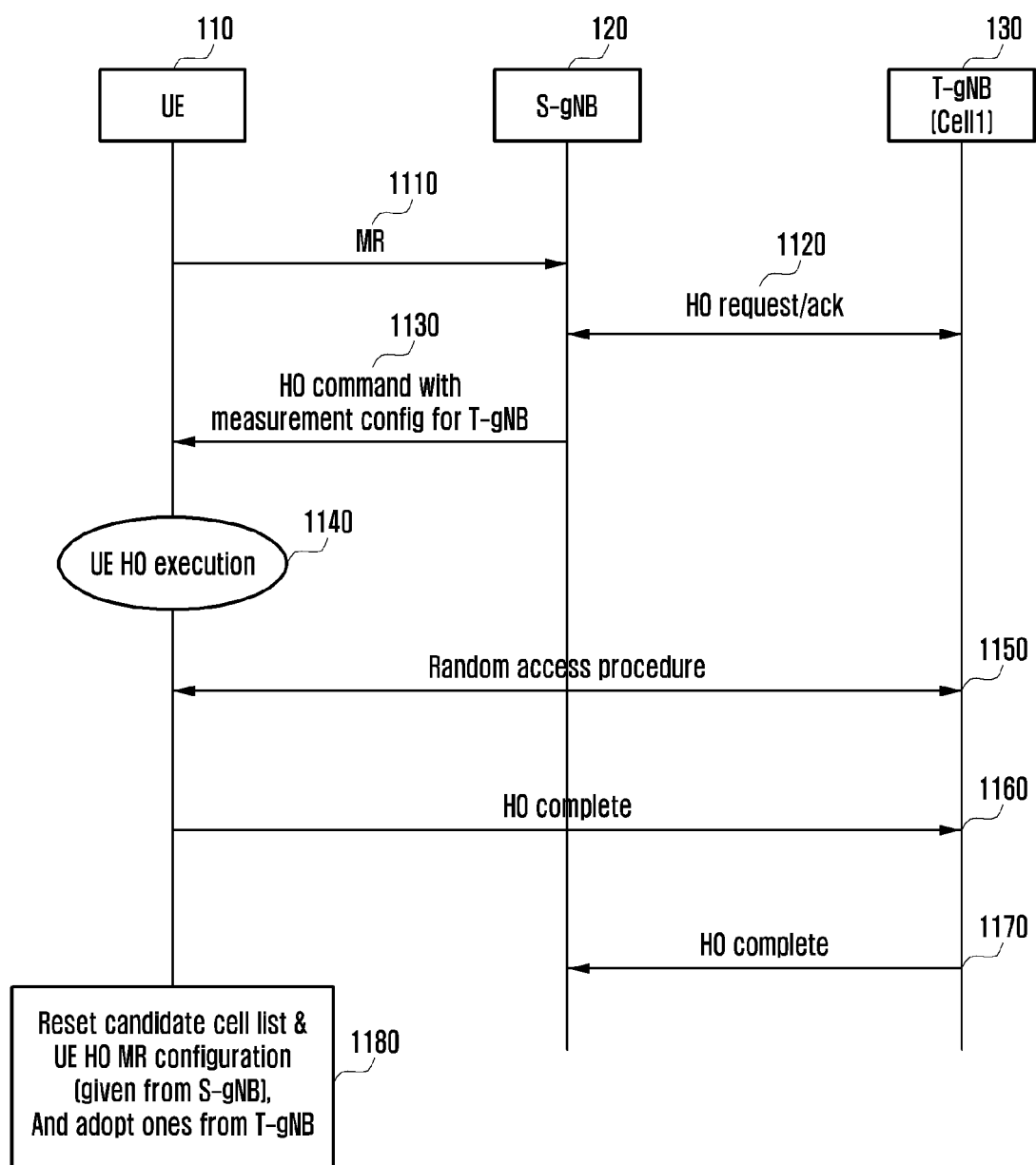
FIG. 11 is a diagram illustrating an operation of processing a candidate cell and MR configuration according to an embodiment of the disclosure.

FIG. 11 is a diagram illustrating an operation of processing a candidate cell and MR configuration according to an embodiment of the disclosure.

<Option 1. An operation for a terminal 110 to reset a candidate cell and MR configuration maintained upon communication with a serving cell 120 after performing handover to a target cell 130>

For example, if the terminal 110 has successfully performed handover to one of selected candidate cells 130 through the method (steps 1110, 1120, 1130, 1140, 1150, 1160, 1170), the terminal 110 may reset the selected candidate cell 130 and an MR configuration for the serving base station through the method. Thereafter, the terminal 110 may perform an operation of obtaining new MR configuration information from the moved serving base station 130 or selecting a new candidate cell (step 1180).

Figure 12:
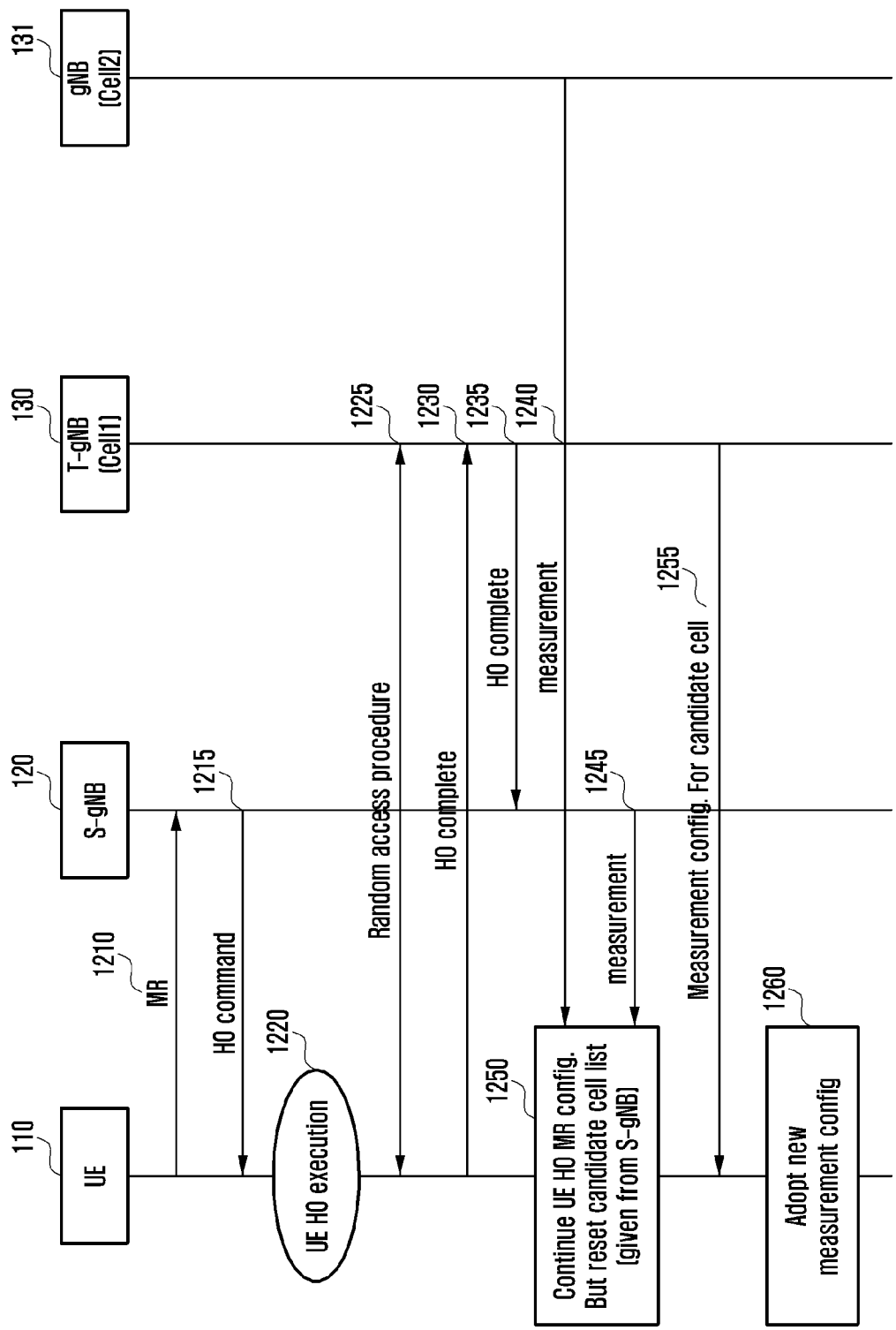
FIG. 12 is a diagram illustrating an operation of processing a candidate cell and MR configuration according to another embodiment of the disclosure.

FIG. 12 is a diagram illustrating an operation of processing a candidate cell and MR configuration according to another embodiment of the disclosure.

<Option 2. An operation for a terminal 110 to maintain a candidate cell reset and MR configuration maintained upon communication with a serving cell 120 after performing handover to a target cell 130, and the terminal uses the candidate cell reset and MR configuration until a new MR configuration is transmitted by the target cell 130>

For example, if the terminal 110 has successfully performed handover to one of selected candidate cells 130 through the method (steps 1210, 1215, 1220, 1225, 1230, 1235), the terminal 110 may reset only the selected candidate cell through the method (step 1250). Thereafter, the terminal 110 may perform an operation of selecting a new candidate cell from the base station 130 to which the terminal has moved (steps 1240, 1245). Furthermore, the terminal 110 may maintain and use an existing MR configuration, and may use the existing MR configuration (step 1255) until it receives a new MR configuration from the base station 130 to which the terminal has moved (step 1260).

Figure 13:
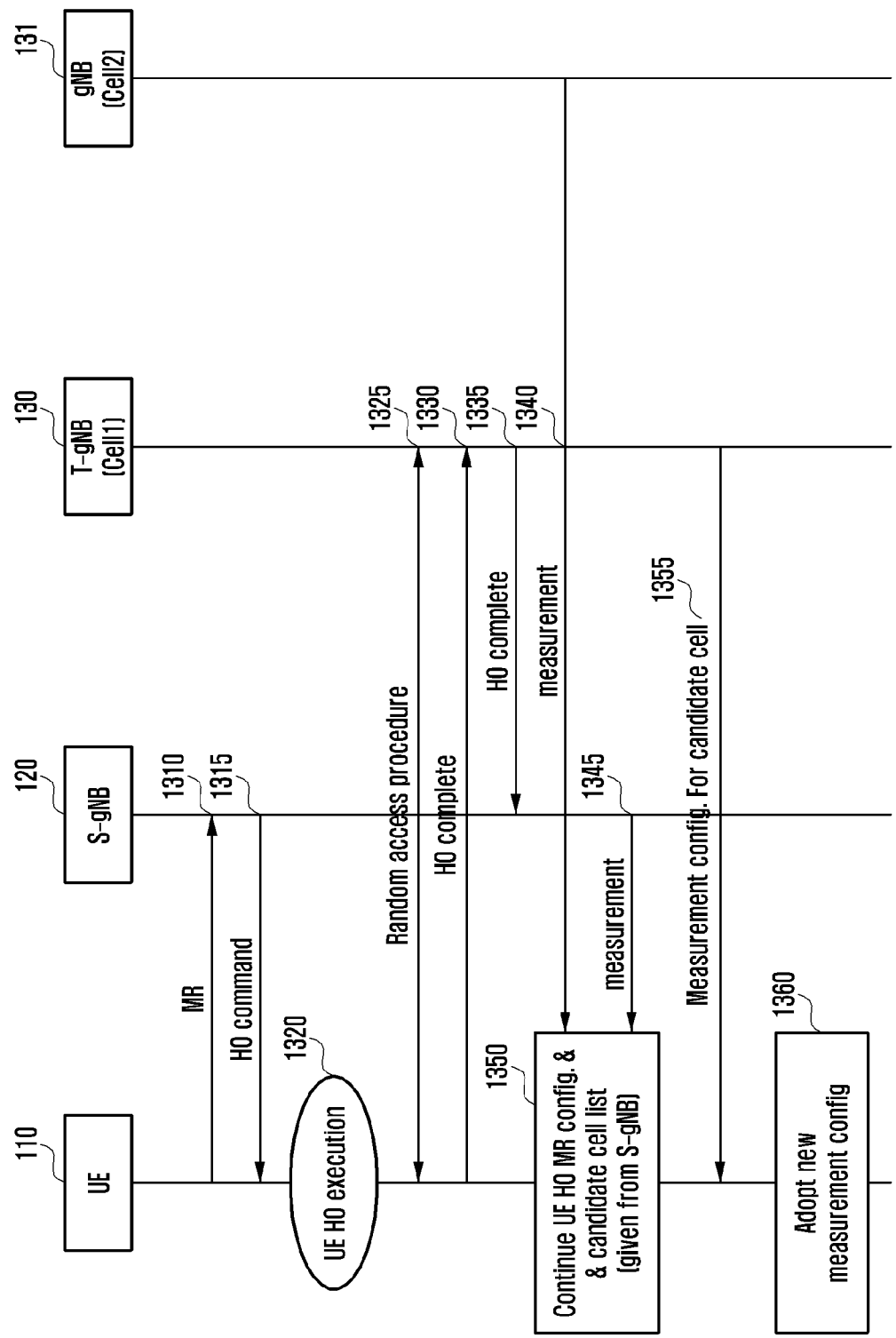
FIG. 13 is a diagram illustrating an operation of processing a candidate cell and MR configuration according to yet another embodiment of the disclosure.

FIG. 13 is a diagram illustrating an operation of processing a candidate cell and MR configuration according to yet another embodiment of the disclosure.

<Option 3. A terminal 110 maintains a candidate cell and MR configuration maintained upon communication with a serving cell 120 after performing handover to a target cell 130. If a new MR configuration is transmitted by the target cell 130, the terminal updates the candidate cell based on the new MR configuration>

For example, if the terminal 110 has successfully performed handover to one of selected candidate cells 130 through the method (steps 1310, 1315, 1320, 1325, 1330, 1335), the terminal 110 may maintain the selected candidate cell 130 and MR configuration method through the method without resetting the selected candidate cell 130 and MR configuration (steps 1350, 1340, 1345). The terminal 110 may use candidate cell information and an MR configuration previously used until it receives a new MR configuration from the base station 130 to which the terminal has moved through the handover (steps 1355, 1360).

<A Target Cell Needs to Perform Signaling that Notifies Candidate Cells of a State Change after a Terminal Executes HO>

Figure 14:
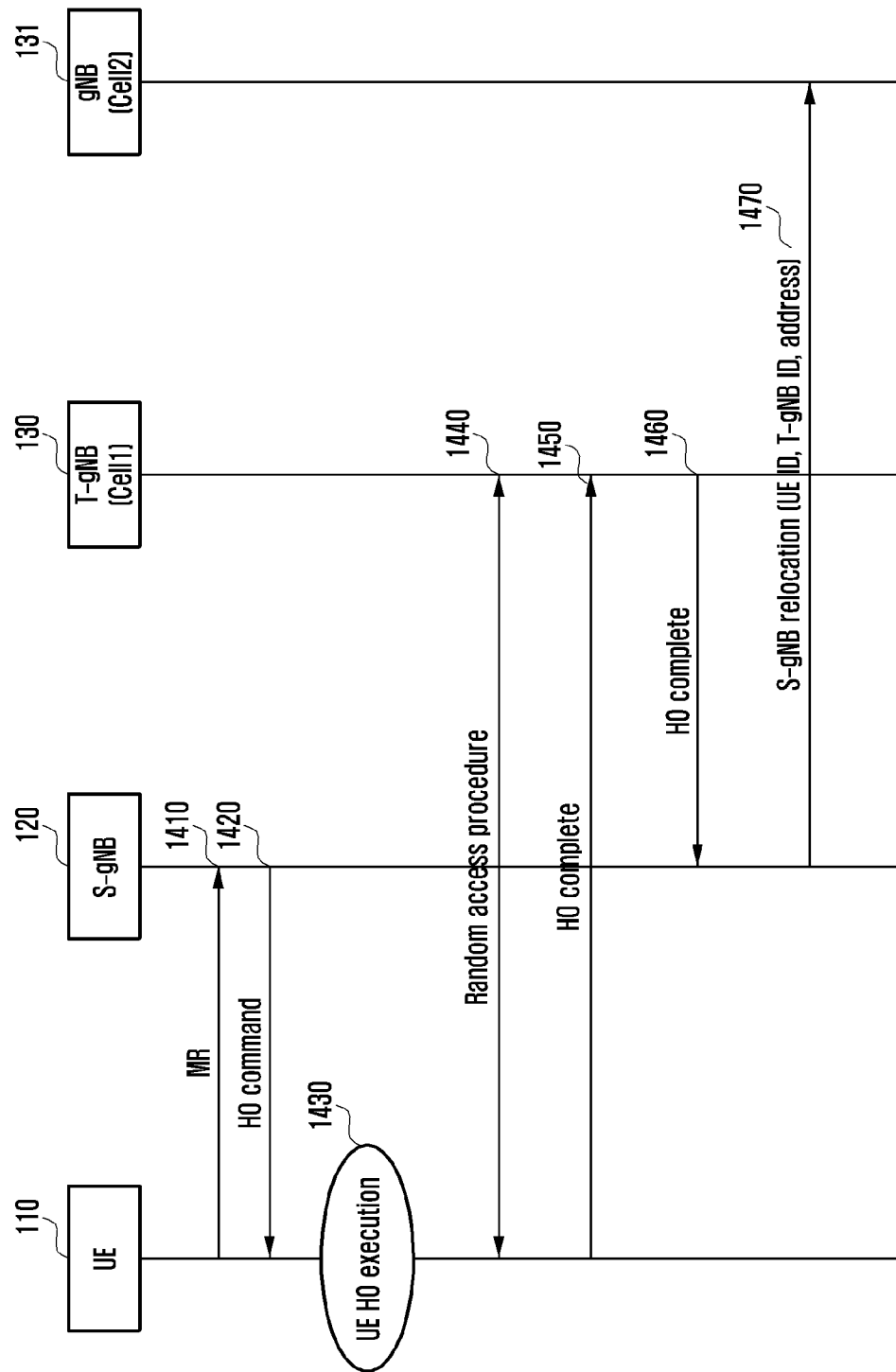
FIG. 14 is a diagram illustrating an operation for a target cell to notify candidate cells of a state change after a terminal performs HO according to an embodiment of the disclosure.

FIG. 14 is a diagram illustrating an operation for a target cell to notify candidate cells of a state change after a terminal performs HO according to an embodiment of the disclosure.

After a terminal 110 performs handover to a target cell 130 (steps 1410, 1420, 1430, 1440, 1450), if the target cell 130 transmits HO complete to a serving cell 120 (step 1460), the serving cell 120 may manage an x2 interface by transmitting serving cell relocation indication, including a new target cell ID and a terminal ID, to all candidate cells 131.

<An Embodiment an Operation for a Terminal to Switch to a Candidate Cell if there is Any One Candidate Cell without Shifting to an Existing Re-Established Cell when an RLF Occurs Due to an MR Transaction Failure and Various Other Causes>

Figure 15:
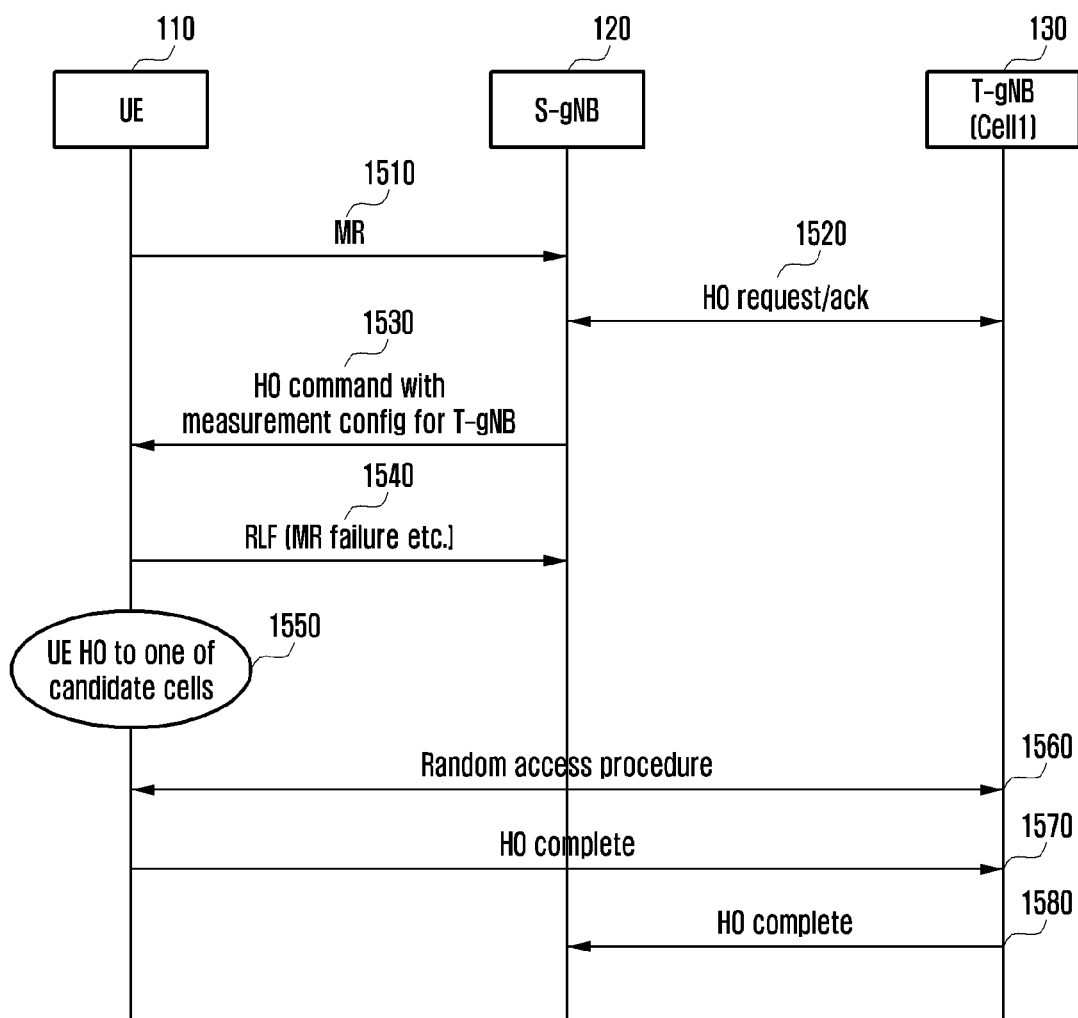
FIG. 15 is a diagram illustrating an operation for a terminal to switch to a candidate cell when an RLF occurs according to an embodiment of the disclosure.

FIG. 15 is a diagram illustrating an operation for a terminal to switch to a candidate cell when an RLF occurs according to an embodiment of the disclosure.

Even if a handover event for a given candidate cell has not been generated, an RLF may occur due to an MR procedure failure or other factors (steps 1510, 1520, 1530, 1540). When an RLF occurs, a terminal 110 does not perform reestablishment, and may attempt handover to a valid candidate cell if the valid candidate cell to which the terminal can switch is present (steps 1550, 1560, 1570, 1580).

A determination of a valid candidate cell to which a terminal can switch may include a cell having the best cell quality in a current candidate cell list.

<An Embodiment of the Definition of a Handover in UE-Based Handover>

HO execution timer (execution time): a terminal 110 starts a timer from the moment when a UE-based 110 execution event is initialized. This timer may be configured as an RRC dedicated message along with a UE HO condition from a serving base station 120. The timer is stopped when the terminal 110 performs HO to a target cell and transmits an HO complete message. If the timer expires, the terminal 110 considers it as an HO failure and enters an RLF processing routine.

Total HO time: in another embodiment, when a terminal 110 receives target cell information, configuration information to be used in a corresponding cell, and a condition to be applied upon HO to the corresponding cell through RRC dedicated signaling from a serving base station 120, the serving base station 120 may provide a separate timer value to the terminal 110 or provide a timer value to the terminal 110 at any timing (system information or when a connection request is first made), so the terminal 110 may start the timer while receiving RRC dedicated signaling that forwards the condition. In this case, the terminal 110 may manage the separate timer for each given candidate target cell, and stops the timer when it transmits an HO complete message because a UE HO condition for the corresponding cell is met and thus the terminal performs HO. If the timer expires, the terminal 110 declares an RLF.

After the terminal 110 receives a measurement configuration for a candidate cell, when an RLF occurs before the terminal performs HO to a target cell, the terminal 110 considers this as an HO failure and enters an RLF processing routine.

The terminal 110 receives a measurement configuration for a candidate cell. Thereafter, the terminal considers an RLF, occurring after receiving an HO command, as an HO failure and enters an RLF processing routine.

The terminal 110 may perform UE HO although any one MR for adding a candidate cell is not triggered.

<Network Signaling Between Candidate Target Cells and a Serving Cell>

If a serving cell 120 notifies a candidate target cell 130 that the serving cell is a candidate target cell and transmits an HO request message to the candidate target cell 130, the candidate target cell 130 performs admission control. If a corresponding terminal 110 determines to accept the serving cell 120 as a candidate target cell, the terminal drives a timer while transmitting an HO request ack message to the serving cell 120. If the terminal 110 does not perform HO during the timer, the candidate target cell 130 performs signaling that inquires the serving cell 120 about whether the terminal 110 is still valid.

A contention free random access (CFRA) timer: Separately, if the candidate target cell 130 determines to admit a corresponding terminal 110 and allocates a CFRA resource, the target cell 130 may manage a separate timer during the time when the corresponding resource can be allocated. A value of this timer is also transmitted to the serving cell 120. The serving cell 120 transmits the value of the timer to the terminal 110. Accordingly, the terminal 110 may also manage a timer for the corresponding CFRA resource. The timer value is included in information, indicating that the target cell has been added as the candidate target cell 130, and RRC dedicated signaling that provides a UE HO execution condition for the candidate target cell 130, and is transmitted from the serving base station 120 to the terminal 110. The terminal 110 may start the timer simultaneously when it receives the signaling. If the timer expires and a different timer (e.g., an execution timer in a previous section or a total HO time) has not still expired, the terminal 110 does not declare an RLF, and may perform UE HO based on contention-based random access.

After a candidate target cell 130 transmits HO request ack to a serving cell 120 because the serving cell 120 notifies the candidate target cell 130 that the serving cell is a candidate target cell, if the candidate target cell 130 can no longer reserve a resource for a UE-based HO terminal in a process of allocating its own resource to terminals 110 out of its coverage or to a terminal 110 that performs network-based handover to the candidate target cell 130, the candidate target cell 130 may transmit a signal to request network release to the serving cell 120, and may immediately release a resource for the UE-based HO terminal 110. Alternatively, the candidate target cell 130 may release the resource after receiving release ack from the serving cell 120.

In the case of a CU-DU, signaling may not be overhead.

If a divided CU-DU structure is present, each cell or base station described above may be mapped to the DU. The DU may include the protocol stack of PHY, MAC, and RLC, and the remaining L2/3 stacks may present in the CU. In this case, when a target cell requires signaling that notifies candidate cells of a state change after a terminal 110 performs HO, or with respect to the signaling of an operation of processing a candidate cell and MR configuration used upon communication with a serving cell 120 after the terminal 110 performs handover, separate RRC signaling is not necessary because RRC entities for respective cells are crowded in a CU that manages multiple DUs, and may be substituted with RRC signaling through an interface within the CU.

Figure 16:
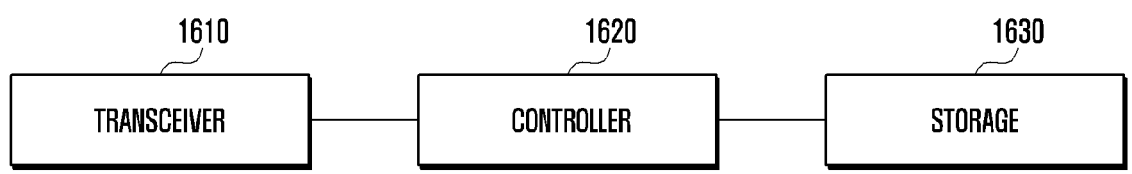
FIG. 16 is a diagram illustrating the configuration of a terminal according to an embodiment of the disclosure.

FIG. 16 is a diagram illustrating the configuration of a terminal according to an embodiment of the disclosure.

Referring to FIG. 16, a terminal 110 may include a transceiver 1610, a controller 1620, and a storage 1630. In the disclosure, the controller 1620 may be defined as a circuit or an application-specific integrated circuit or at least one processor.

The transceiver 1610 may transmit and receive signals to and from another network entity.

The controller 1620 may control an overall operation of the terminal 110 according to the embodiments proposed in the disclosure. For example, the controller 1620 may control a flow of signals between the blocks so that the operations according to the flowchart are performed. For example, the controller 1620 may transmit a first message, including information on a candidate target cell, to the serving base station 120, and may receive a second message, including information on a condition for conditional handover related to the candidate target cell 130 from the serving base station 120. If a measurement result for the candidate target cell 130 meets the condition for the conditional handover, the controller 1620 may perform handover to the candidate target cell 130.

The storage 1630 may store at least one of information transmitted and received through the transceiver 1610 and information generated through the controller 1620.

Figure 17:
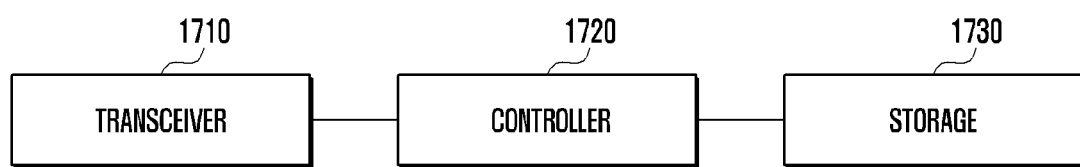
FIG. 17 is a diagram illustrating the configuration of a base station according to an embodiment of the disclosure.

FIG. 17 is a diagram illustrating the configuration of a base station according to an embodiment of the disclosure.

Referring to FIG. 17, the base station may include a transceiver 1710, a controller 1720, and a storage 1730. In the disclosure, the controller 1710 may be defined as a circuit or an application-specific integrated circuit or at least one processor.

The transceiver 1710 may transmit and receive signals to and from another network entity.

The controller 1720 may control an overall operation of the base station according to the embodiments proposed in the disclosure. For example, the controller 1720 may control a flow of signals between the blocks so that the operations according to the flowchart are performed. For example, the controller 1720 may receive a first message, including information on the candidate target cell 130, from the terminal 110, may transmit a second message, including configuration request information for conditional handover, to the candidate target cell 130, may receive a third message, including configuration approval information for the conditional handover, from the candidate target cell 130, may configure a condition for the conditional handover on which the terminal 110 perform handover to the candidate target cell 130, and may transmit a fourth message, including information on the condition for the conditional handover related to the candidate target cell 130, to the terminal 110.

The storage 1730 may store at least one of information transmitted and received through the transceiver 1710 and information generated through the controller 1720.

<A Detailed Example of Signaling that a Serving Cell Designates a UE HO Condition for a Terminal>

In this embodiment, a detailed example in which the serving base station 120 signals required information for UE HO independently of an operation for the serving base station 120 to signal a separate M value to the terminal 110 is handled. Furthermore, in the description of all subsequent embodiments, an NR-specific signaling field, such as reconfigurationWithSync instead of the mobilityControlInfo signaling field, may be taken into consideration as a container that transmits a conditional HO command or a configuration in a required target cell upon HO and a condition for conditional HO (CHO).

In the case of all conditional HOs, the serving cell 120 may transmit at least next information to the terminal 110. That is, the serving cell 120 may transmit three types of information, that is, the cell ID of a candidate target cell, a reference measurement ID, and delta information to be used when a measurement for conditional HO is performed by partially changing a measurement corresponding to the ID, to the terminal 110. In this case, the reference measurement ID is one of measurement IDs already configured in the terminal 110, and means a measurement to which reference is made when a measurement operating to newly perform conditional HO is configured in the terminal 110. In this case, the reference means that most of configuration information configured in the measurement is reused. Only the delta information of the three types of information is newly substituted information.

The terminal 110 that has received the information performs a new measurement to which given delta info information has been applied instead of measurement configuration information of an indicated measurement ID. In this case, the measurement is performed on the target cell of the above-signaled cell ID.

If conditional HO is to be configured in multiple candidate target cells, the serving base station 120 may signal, to the terminal 110, a measurement ID, already maintained by the terminal 110 and being a reference for delta info and update, for each candidate target cell ID. That is, the serving base station 120 may transmit a plurality of three types of information to the terminal 110. The reason for this is that there is an advantage in that signaling overhead can be reduced compared to a case where all types of separate measurement configuration information are transmitted because most of the factors of a measurement configuration used by the terminal 110 are similar in most of types of information in normal HO in addition to conditional HO. Furthermore, in the existing event for normal HO, if an offset is 2 dB in A3, conditional HO needs to operate if received power of a serving cell is suddenly reduced, so an offset value of a greater value (e.g., 5 dB) may be set in A3, that is, the same HO event, based on the original purpose of conditional HO. That is, if the serving base station 120 provides offset=5 dB, a measurement ID in which the A3 event has been configured, and a target cell ID to the terminal 110 as described above, the terminal 110 uses all measurement configuration values previously used in the A3 event, substitutes only the offset value with 5, and measures the target cell ID. If the measurement is performed as described above and the A3 event is met with respect to the offset value, the terminal 110 does not transmit an MR to the serving base station 120 and directly performed HO to the target cell 130.

Figure 18:
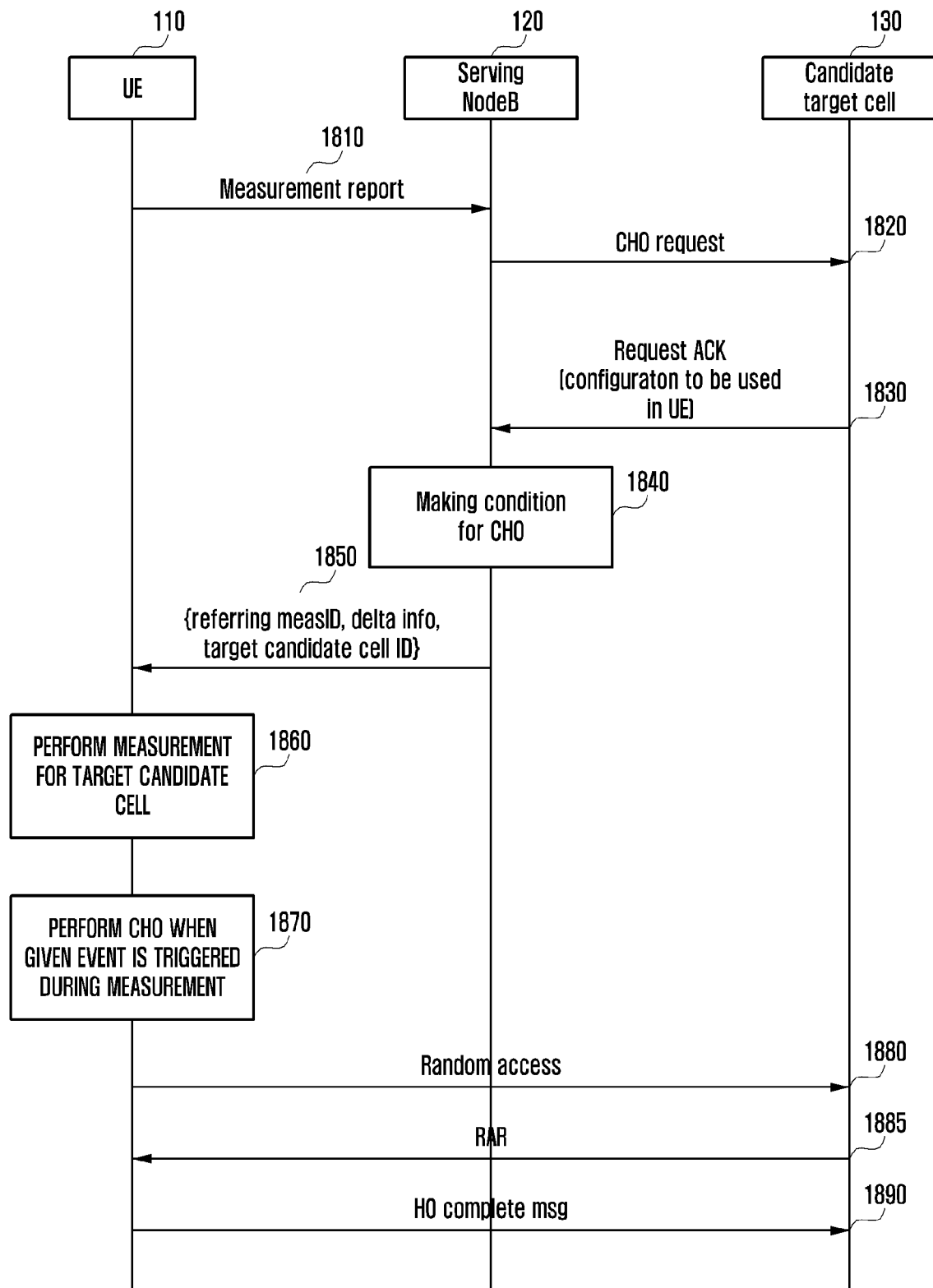
FIG. 18 is a diagram illustrating an operation method of conditional HO according to an embodiment of the disclosure.

FIG. 18 is a diagram illustrating an operation method of conditional HO according to an embodiment of the disclosure.

When a terminal 110 transmits, to a serving base station 120, event-triggered results from a measurement configuration for pre-defined normal HO as an MR (step 1810), if the serving cell 120 transmits a CHO request to a candidate target cell 130 indicated in the corresponding MR (step 1820), the corresponding cell 130 identifies that HO is possible based on its own resource situation and configuration information of the UE, and transmits the ack of the request to the serving cell 120 again if possible (step 1830). The serving cell 120 makes a CHO condition for the candidate target cell 130 (step 1840), invokes most of measurement configuration information configuring the condition, and provides a reference measurement ID to be reused, delta info to be newly applied to a measurement in addition to the reuse, and a candidate target cell ID to the terminal 110 (step 1850). When the terminal 110 receives this information, it performs a new measurement to which given delta info has been applied in a measurement configuration corresponding to the indicated measurement ID. The subject of the new measurement is the candidate target cell 130 given at step 1850 (step 1860). If an event configured in a given measurement for CHO is established because a given time elapses (step 1870), the terminal 110 performs 110 to the candidate target cell 130 (steps 1880, 1885, 1890).

Figure 19:
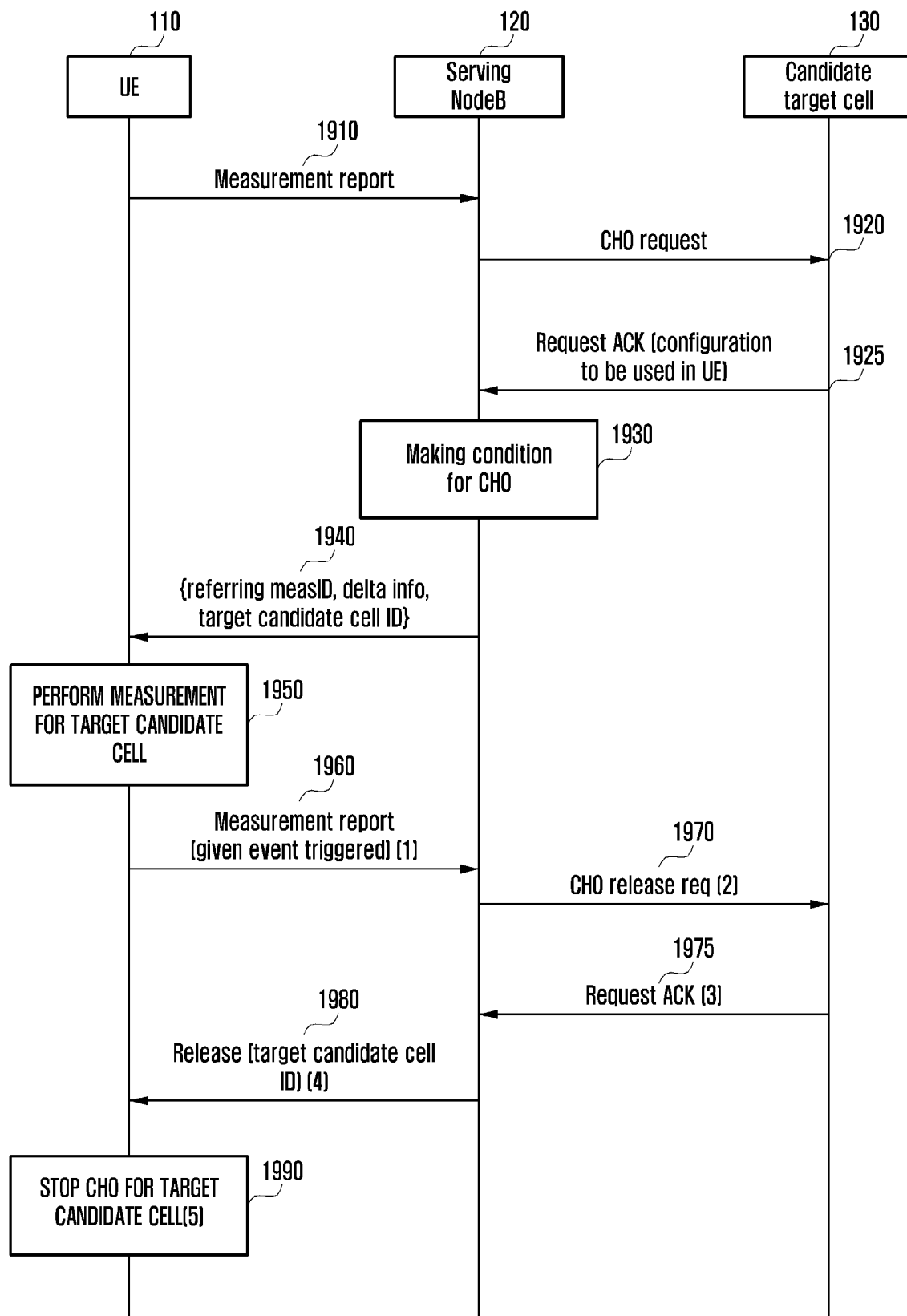
FIG. 19 is a diagram illustrating an operation method of conditional HO according to another embodiment of the disclosure.

FIG. 19 is a diagram illustrating an operation method of conditional HO according to another embodiment of the disclosure.

In another embodiment, while a terminal 110 performs CHO (steps 1910, 1920, 1925, 1930, 1940, 1950), if an event, meaning that a signal with a candidate target cell 130 is not good during the existing measurement separately from a measurement for the CHO, has been configured and the event is triggered, the terminal 110 notifies a serving cell of the corresponding measurement results (step 1960). The serving cell 120 requests the corresponding candidate target cell 130 to be released from a target cell for conditional 110 because the corresponding candidate target cell 130 does not have an effective value (step 1970). If the candidate target cell 130 provides the serving cell with a signal that accepts the request (step 1975), the serving cell 120 transmits, to the terminal 110, a signal indicating that the terminal has to stop CHO with the corresponding candidate target cell ID and release a corresponding resource (step 1980). The terminal 110 that has received the signal stops a measurement operation for CHO for the corresponding candidate target cell 130 and releases the existing resource configuration for a candidate target cell (step 1990).

Figure 20:
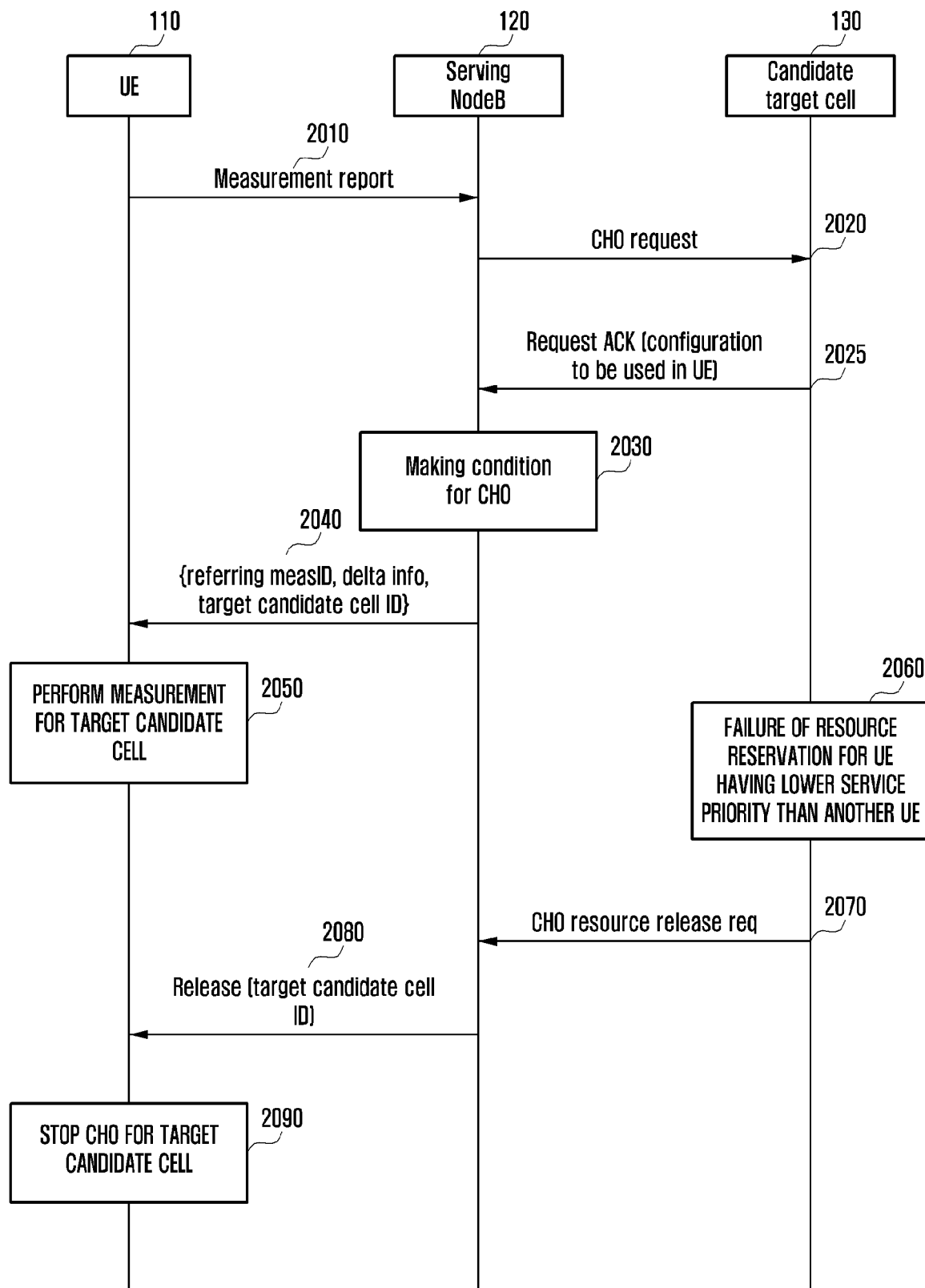
FIG. 20 is a diagram illustrating an operation method of conditional HO according to yet another embodiment of the disclosure.

FIG. 20 is a diagram illustrating an operation method of conditional HO according to yet another embodiment of the disclosure.

In another embodiment, while the terminal 110 performs CHO (steps 2010, 2020, 2025, 2030, 2040, 2050), if a candidate target cell 130 gives priority to a different terminal 110 not based on results measured by the terminal 110 and performs resource allocation, terminal allocation for CHO may be released. If the candidate target cell 130 notifies a serving cell 120 (step 2070) of CHO resource release request contents attributable to the priority of the different terminal (step 2060), the serving cell 120 transmits a corresponding candidate target cell ID and release indication to the terminal 110 (step 2080). In response thereto, the terminal 110 stops a measurement performed toward the corresponding candidate target cell 130, and releases resource configuration information to be used in the candidate target cell 130 (step 2090).

Figure 21:
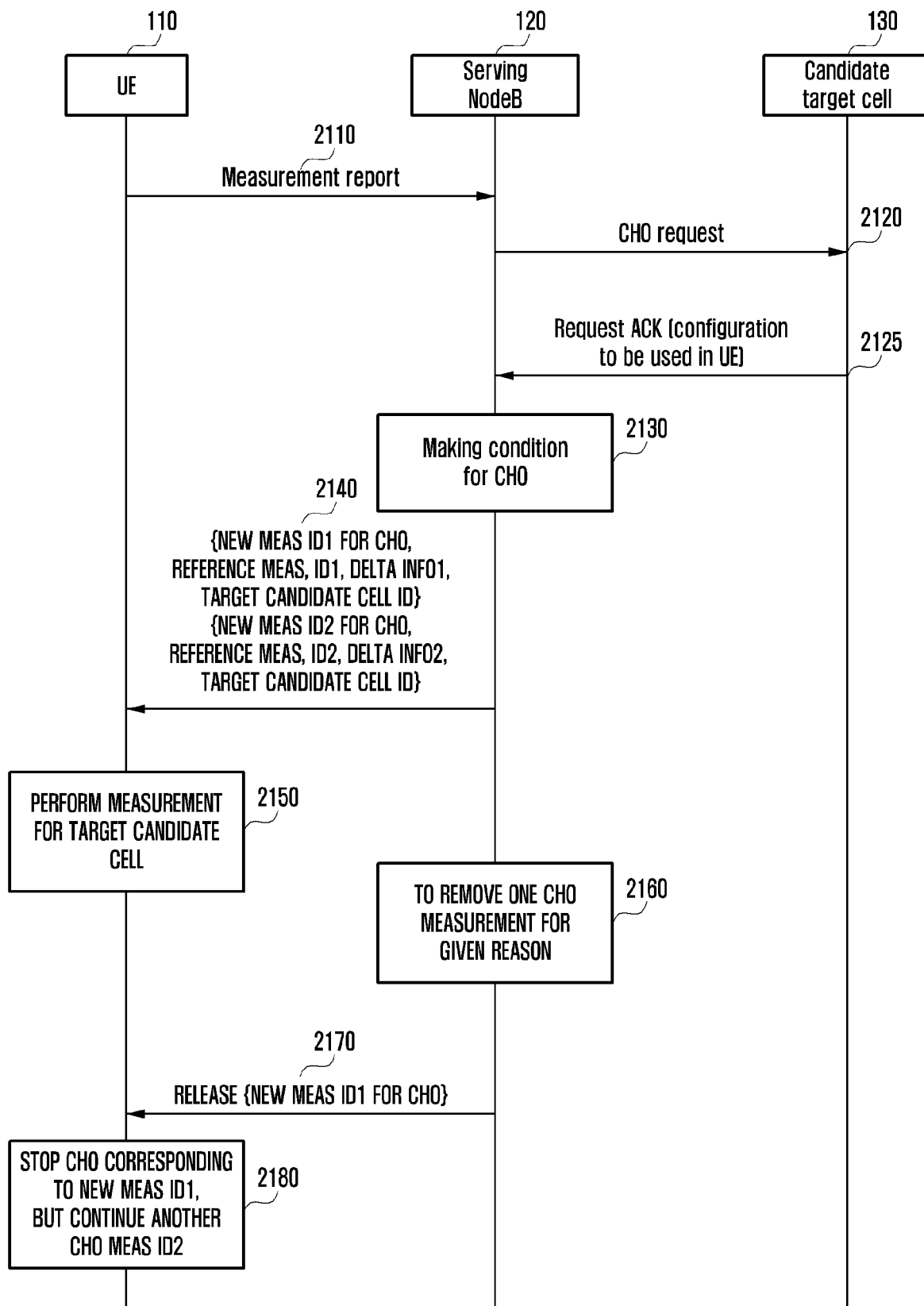
FIG. 21 is a diagram illustrating an operation method of conditional HO according to yet another embodiment of the disclosure.

FIG. 21 is a diagram illustrating an operation method of conditional HO according to yet another embodiment of the disclosure.

In another embodiment, when a serving cell 120 transmits such information on the candidate target cell 130 to the terminal 110, quadruplet information may be given to the terminal 110 like (a new measurement ID for CHO, a reference measurement ID, delta info, and a target cell ID). In this case, a portion newly included compared to the previous example is the "new measurement ID for CHO." If the terminal 110 receives the ID, the terminal 110 makes a new measurement to be used for CHO based on the existing triplet (reference measurement ID, delta info, and target cell ID) information, but newly allocates an ID to the measurement as a value of "new measurement ID for CHO." In a method of explicitly allocating an ID to a measurement for CHO, the ID may be used for the serving base station 120 to modify or release a measurement compared to a method of making and using a measurement for CHO without an ID. Furthermore, if a given candidate target cell has multiple measurement configurations, it is difficult to refer to a given one of the multiple measurement configuration and to modify or release the given measurement configuration, in preparation for this case, it is necessary to allocate a separate measurement ID for CHO to each measurement configuration for CHO so that the serving cell 120 can subsequently manage the measurement for CHO.

In FIG. 21, as in FIGS. 18 to 20, when a terminal 110 transmits, to a serving base station 120, a report indicating that a pre-configured event is triggered and a candidate target cell 130 may become a candidate for CHO through a normal measurement (step 2110), the serving base station 120 makes an HO request (step 2120) from the corresponding candidate target cell 130. The candidate target cell 130 transmits configuration information to be used in the candidate target cell 130 to the serving cell 120 through ACK (step 2125). The serving base station 120 transmits a condition for CHO to the terminal 110 along with the configuration information. In this case, the serving base station 120 transmits a plurality of reference measurement IDs and delta info to the single candidate target cell 130 (steps 2130, 2140). When the information is received, the terminal 110 configures a different type of measurement for CHO and performs a plurality of measurements on the candidate target cell 130 (step 2150). If a meas ID1 for CHO is to be removed at any timing (step 2160), the serving base station 120 may signal that the terminal 110 should release the corresponding meas ID1 for CHO (step 2170). When the signal is received, the terminal 110 performs only a measurement for a meas ID2 configured in the candidate target cell 130 and stops the measurement for the remaining meas ID1 (step 2180). In this case, if a measurement for CHO is to be removed for a given reason, the corresponding reason may be a case indicative of an event in which information indicating that the radio state of the corresponding candidate target cell 130 is not suitable for the meas ID1 is received from the UE 110 through an MR or a resource situation is changed so that the candidate target cell 130 does not guarantee given link quality and the meas ID1 for CHO guarantees such link quality.

In another embodiment, the terminal 110 is not notified of a measurement for CHO through a reference measurement ID and delta info as in the examples, but is notified of all types of required information necessary for CHO through an independent measurement configuration. The terminal 110 that has received the information may configure a new measurement for CHO without the existing reference measurement without any change. In a more detailed example related to this, independent measurement configuration information may be divided into absolute measurement object information and report configuration information. All of types of independent information of the serving base station 120 are transmitted to the terminal 110. Even in this case, a new measurement ID for CHO may be newly allocated explicitly or may not be allocated. If a measurement ID has been explicitly allocated, when the serving base station 120 subsequently tries to release a corresponding measurement for conditional HO, it may denote a meas ID and release the corresponding measurement. If a measurement ID is not explicitly allocated, the serving base station 120 may release or re a corresponding measurement by signaling a candidate target cell ID to the terminal 110. If an ID is explicitly allocated, the existing reference meas ID and a new CHO meas ID may be separately managed.

In all the above-described embodiments, delta info may become the following information or may become a combination of corresponding information.

(Information related to a report configuration) this may be at least one of pieces of information, including an event type (e.g., this may mean an event present on a reportConfig IE, such as A1~A6, B1, A2, C1, or C2 used in LTE), threshold and power offset information necessary for the corresponding event type, a hysteresis value, measurement quantity, information indicating whether to include beam measurement results, information indicating whether to trigger ReportOnLeave, or a time to trigger value, information indicating whether a report is a periodic report, measurement trigger quantity information, report quantity information, or an NR RS type. Furthermore, info on related to a measurement object may be given.

Furthermore, (information related to a measurement object) this may be a received power offset value for a given measurement frequency, a cell ID to be measured, cell information to which alternative TTT will be applied, information indicating whether to apply t312, a received power individual offset value for a given designated cell, subframe information for performing a measurement, SSB configuration information (e.g., time window and frequency location information of an SSB, SMTC information, or subcarrier spacing information) or CSI-RS configuration information (a cell ID, a bandwidth, CSI-RS time/frequency location information, density, a CSI-RS index list, slot config, or an associated SSB index) of a corresponding cell, a beam ID to be measured in a corresponding cell or the number of beams necessary when a beam ID is calculated and received power threshold value-related information, L3 filter value information for conditional HO, a minimum threshold value of received power of a beam to be used in a measurement, or the number of SSBs or CSI-RSs that will take an average value.

In another embodiment, if the serving base station 120 configures an M value in the terminal 110 with respect to a given event (140 in FIG. 1), the terminal 110 may sequence target cells in order of the best link performance, among cells meeting the event (140 in FIG. 1), always at timing in which an event is triggered unlike a case here target cells are put into a candidate cell set in a time sequence in which a corresponding event is triggered, and may maintain upper M target cells as a candidate target cell. To this end, the terminal 110 may always sequence the target cells in order of link performance measured for each target cell at timing in which a configured event is triggered. When the terminal 110 selects M best cells from the cells meeting the event (140 in FIG. 1) based on the sequence, if the selected M best cells are different from M candidate target cells already reported to the serving base station 120, the terminal 110 may transmit, to the serving base station 120, a signal that changes the selected M best cells. The signal may include information on a cell to be excluded from the existing candidate target cell and a cell that needs to be added because the cell is not present in the existing candidate target cell. When the serving base station 120 receives the information, it performs a candidate cell removal procedure on the cell to be removed and performs a candidate cell addition procedure, including handover preparation and ack, on the cell to be added.

As described above, in addition to measured cell link quality, a degree that a cell is busy or measured received intensity information of only a given reference signal may be considered as a metric for the selection of M candidate target cells of the terminal 110. For example, if a case where received intensity of a given RS is a given value or more is discovered for a given period by a given number of times, this may indicate that a cell is busy. The terminal 110 may store M best cells based on the metric and notify the serving base station 120 of the stored M best cells.

The technology proposed in this patent may also be applied to other cellular systems. For example, in the case of an unlicensed frequency band system, all terminals 110 may perform listen-before-talk (LBT) and perform transmission only when a condition is met. Each cell can also perform transmission only when the condition is met. Accordingly, as in the existing cellular system, delay attributable to LBT may occur in control plane signaling, such as a measurement report and a handover command. In this case, a terminal may enter an RLF because it does not perform handover at a proper time. In order to prepare such a case, if the serving base station 120 provides the terminal 110 with an HO execution condition and corresponding target cell information in advance and thus the condition is met, the terminal 110 may perform handover without separate signaling along with the serving base station 120.

Furthermore, in the case of V2X or an aerial vehicle, if coverage matching with the moving speed of the terminal 110 and a base station is not properly performed, control plane signaling may be unstable. In order to solve this problem, the serving base station 120 may notify the terminal 110 of a condition for UE-based HO and target cell information in advance.

The embodiments of the disclosure disclosed in the specification and drawings have suggested given examples in order to easily describe the technical contents of the disclosure and to help understanding of the disclosure, and are not intended to limit the scope of the disclosure. That is, it is evident to those skilled in the art to which the disclosure pertains that other modified examples based on technical spirit of the disclosure may be practiced. Furthermore, the embodiments may be combined and operated, if necessary.

The invention claimed is:

1. A method performed by a terminal in a wireless communication system, the method comprising:
    receiving, from a source base station, a first message for conditional handover configuration, the first message comprising first information on at least one candidate target base station and second information on at least one execution condition for a conditional handover related to each of the at least one candidate target base station;
    in case that a radio link failure (RLF) for the source base station occurs, identifying a suitable cell based on a measurement; and
    in case that the suitable cell is associated with a target base station among the at least one candidate target base station, transmitting, to the target base station, a second message for the conditional handover based on the first information,
    wherein a radio resource control (RRC) re-establishment procedure of the terminal is not performed after the RLF for the source base station occurs.

2. The method of claim 1, further comprising:
    receiving, from the source base station, a third message for releasing the conditional handover configuration; and
    releasing the conditional handover configuration.

3. The method of claim 1,
    wherein the first information on the at least one candidate target base station includes identifier (ID) information of the at least one candidate target base station, and
    wherein the second information on the at least one execution condition for the conditional handover includes measurement ID information.

4. A method performed by a base station in a wireless communication system, the method comprising:
    transmitting, to at least one candidate target base station, a request message for requesting a conditional handover;
    receiving, from the at least one candidate target base station, a request acknowledge message as a response to the request message; and
    transmitting, to a terminal, a first message for conditional handover configuration, the first message comprising first information on the at least one candidate target base station and second information on at least one execution condition for a conditional handover related to each of the at least one candidate target base station,
    wherein in case that a radio link failure (RLF) for the base station occurs in the terminal and a suitable cell that is associated with a target base station among the at least one candidate target base station is identified based on a measurement of the terminal, a second message for the conditional handover is transmitted to the target base station according to the first information, and
    wherein a radio resource control (RRC) re-establishment procedure of the terminal is not performed after the RLF for the base station occurs in the terminal.

5. The method of claim 4,
    wherein the first information on the at least one candidate target base station includes identifier (ID) information of the at least one candidate target base station, and
    wherein the second information on the at least one execution condition for the conditional handover includes measurement ID information.

6. The method of claim 4, further comprising:
transmitting, to the terminal, a third message for releasing the conditional handover configuration.

7. A terminal, the terminal comprising:
a transceiver; and
a controller configured to:
  receive, from a source base station via the transceiver, a first message for conditional handover configuration, the first message comprising first information on at least one candidate target base station and second information on at least one execution condition for a conditional handover related to each of the at least one candidate target base station,
  in case that a radio link failure (RLF) for the source base station occurs, identify a suitable cell based on a measurement, and
  in case that the suitable cell is associated with a target base station among the at least one candidate target base station, transmit, to the target base station via the transceiver, a second message for the conditional handover based on the first information,
  wherein a radio resource control (RRC) re-establishment procedure of the terminal is not performed after the RLF for the source base station occurs.

8. The terminal of claim 7, wherein the controller is further configured to:
receive, from the source base station via the transceiver, a third message for releasing the conditional handover configuration, and
release the conditional handover configuration.

9. The terminal of claim 7,
wherein the first information on the at least one candidate target base station includes identifier (ID) information of the at least one candidate target base station, and
wherein the second information on the at least one execution condition for the conditional handover includes measurement ID information.

10. A base station, the base station comprising:
a transceiver; and
a controller configured to:
  transmit, to at least one candidate target base station via the transceiver, a request message for requesting a conditional handover,
  receive, from the at least one candidate target base station via the transceiver, a request acknowledge message as a response to the request message, and
  transmit, to a terminal via the transceiver, a first message for conditional handover configuration, the first message comprising first information on the at least one candidate target base station and second information on at least one execution condition for a conditional handover related to each of the at least one candidate target base station,
  wherein in case that a radio link failure (RLF) for the base station occurs in the terminal and a suitable cell that is associated with a target base station among the at least one candidate target base station is identified based on a measurement of the terminal, a second message for the conditional handover is transmitted to the target base station according to the first information, and
  wherein a radio resource control (RRC) re-establishment procedure of the terminal is not performed after the RLF for the base station occurs in the terminal.

11. The base station of claim 10, wherein the controller is configured to transmit, to the terminal via the transceiver, a third message for releasing the conditional handover configuration.

* * * * *